United States Patent
Ikawa et al.

(10) Patent No.: US 11,330,133 B2
(45) Date of Patent: May 10, 2022

(54) ELECTRONIC APPARATUS AND METHOD FOR CONTROLLING DISPLAY OF A NOTIFICATION SCREEN

(71) Applicant: Ricoh Company, Ltd., Tokyo (JP)

(72) Inventors: Taku Ikawa, Kanagawa (JP); Hiroatsu Hatanaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/117,755

(22) Filed: Dec. 10, 2020

(65) Prior Publication Data

US 2021/0195049 A1 Jun. 24, 2021

(30) Foreign Application Priority Data

Dec. 23, 2019 (JP) .............................. JP2019-231999

(51) Int. Cl.
*H04N 1/00* (2006.01)
*H04N 1/44* (2006.01)
*G06F 8/65* (2018.01)

(52) U.S. Cl.
CPC ........... *H04N 1/00973* (2013.01); *G06F 8/65* (2013.01); *H04N 1/0097* (2013.01); *H04N 1/00411* (2013.01); *H04N 1/4426* (2013.01)

(58) Field of Classification Search
None
See application file for complete search history.

(56) References Cited

U.S. PATENT DOCUMENTS

| | | |
|---|---|---|
| 2011/0055825 A1 | 3/2011 | Ikawa et al. |
| 2011/0066886 A1 | 3/2011 | Sugiura et al. |
| 2011/0067117 A1 | 3/2011 | Nagumo et al. |
| 2011/0239208 A1* | 9/2011 | Jung ........................ G06F 8/65 717/170 |
| 2013/0139142 A1 | 5/2013 | Ikawa et al. |
| 2013/0145141 A1 | 6/2013 | Han et al. |
| 2013/0174270 A1 | 7/2013 | Sugiura et al. |
| 2014/0026209 A1* | 1/2014 | Asahara ................... G06F 21/31 726/16 |
| 2014/0173762 A1 | 6/2014 | Sugiura et al. |
| 2015/0220323 A1 | 8/2015 | Ikawa et al. |
| 2016/0337543 A1* | 11/2016 | Kano ....................... G06F 9/454 |
| 2016/0337544 A1* | 11/2016 | Han .................... H04N 1/00938 |
| 2016/0373460 A1* | 12/2016 | Itoh .................... H04N 1/00464 |
| 2017/0171415 A1* | 6/2017 | Kubokura .......... H04N 1/00204 |
| 2017/0251122 A1* | 8/2017 | Matsushima ...... H04N 1/00244 |
| 2017/0255992 A1* | 9/2017 | Han .................... G06Q 30/0641 |
| 2018/0181388 A1* | 6/2018 | Takahashi ............. G06F 3/1285 |

(Continued)

FOREIGN PATENT DOCUMENTS

| | | |
|---|---|---|
| JP | 2008-071077 | 3/2008 |
| JP | 2015-138297 | 7/2015 |

*Primary Examiner* — Henok Shiferaw
(74) *Attorney, Agent, or Firm* — Xsensus LLP

(57) ABSTRACT

An electronic apparatus includes circuitry. The circuitry acquires, from an external server, information related to software that is downloadable on the electronic apparatus through a network and installable on the electronic apparatus. The circuitry determines whether at least conditions of authentication settings with respect to the electronic apparatus are satisfied. The circuitry displays, on a display, a notification screen for notifying the acquired information, according to a determination result.

19 Claims, 17 Drawing Sheets

(56) References Cited

U.S. PATENT DOCUMENTS

| | | | |
|---|---|---|---|
| 2018/0260172 A1* | 9/2018 | Nakamura | H04N 1/00941 |
| 2018/0302525 A1* | 10/2018 | Han | H04N 1/00973 |
| 2019/0286393 A1* | 9/2019 | Sato | H04N 1/0048 |
| 2019/0354323 A1* | 11/2019 | Akimoto | H04N 1/0035 |
| 2019/0373130 A1* | 12/2019 | Han | G06F 8/62 |

* cited by examiner

ELECTRONIC APPARATUS AND METHOD FOR CONTROLLING DISPLAY OF A NOTIFICATION SCREEN

CROSS-REFERENCE TO RELATED APPLICATION

This patent application is based on and claims priority pursuant to 35 U.S.C. § 119(a) to Japanese Patent Application No. 2019-231999, filed on Dec. 23, 2019, in the Japan Patent Office, the entire disclosure of which is hereby incorporated by reference herein.

BACKGROUND

Technical Field

Embodiments of the present disclosure relate to an electronic apparatus, a method of processing information, and a non-transitory recording medium storing instructions for executing a method of processing information.

Related Art

Conventionally, in a multifunction peripheral (MFP), which is an example of an electronic apparatus, a technique of automatically updating an application or firmware is known.

As such an automatic updating technique, a technique of automatically updating the latest firmware in the MFP is known.

SUMMARY

An exemplary embodiment of the present disclosure includes an electronic apparatus that includes circuitry. The circuitry acquires, from an external server, information related to software that is downloadable on the electronic apparatus through a network and installable on the electronic apparatus. The circuitry further determines whether at least conditions of authentication settings with respect to the electronic apparatus are satisfied. The circuitry further displays, on a display, a notification screen for notifying the acquired information, according to a determination result.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
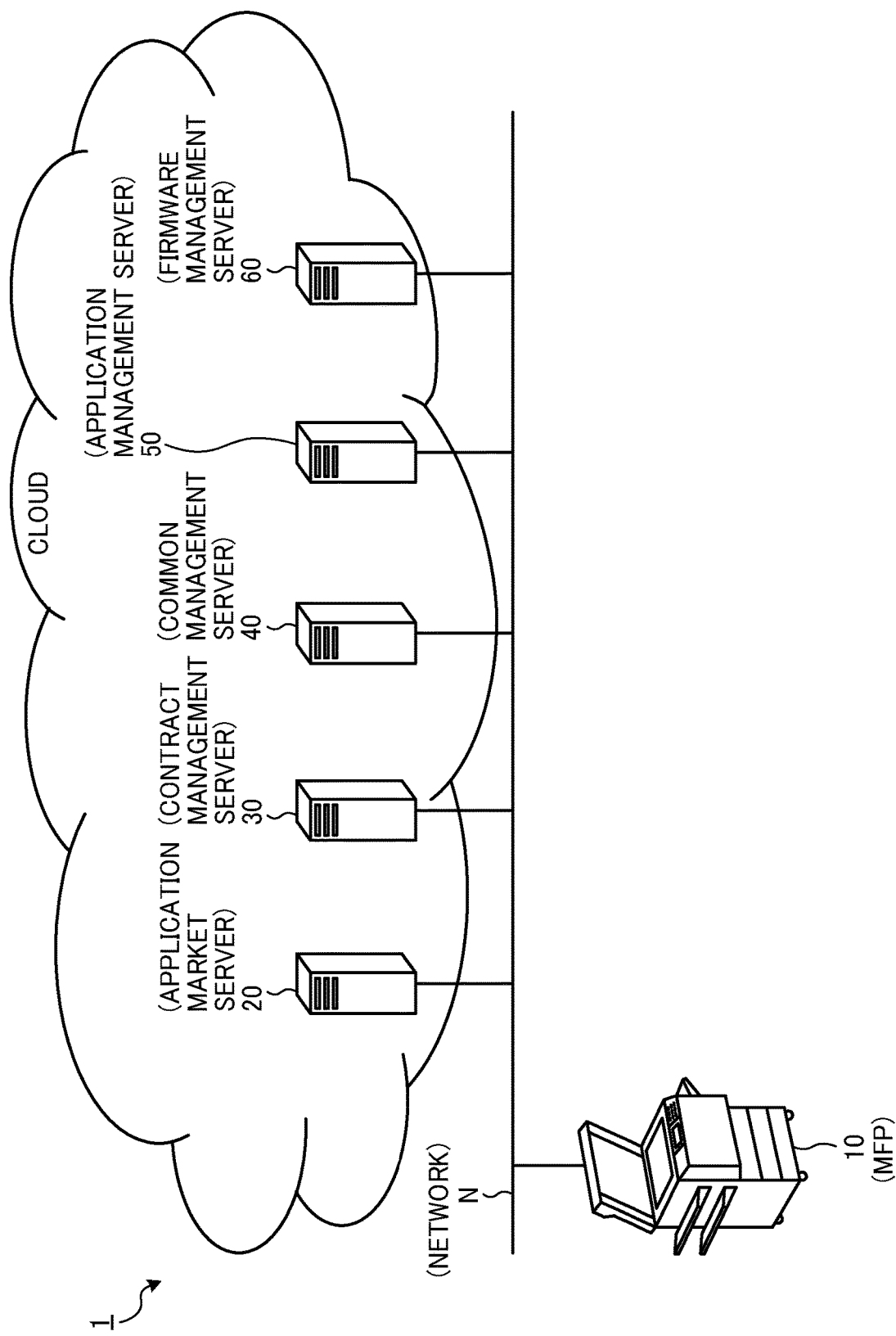
FIG. 1 is a diagram illustrating an example of an overall configuration of an information processing system according to one or more embodiments of the disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of an electronic apparatus, an information processing system, a method of processing information, and an information processing program, according to one or more embodiments of the present disclosure, with reference to the attached drawings. The present disclosure, however, is not limited to the following embodiment, and the constituent elements of the following embodiment include elements that may be easily conceived by those skilled in the art, those being substantially the same ones, and those being within equivalent ranges. Furthermore, various omissions, substitutions, changes and combinations of the constituent elements may be made without departing from the gist of the following one or more embodiments.

In the description of the embodiment given below, the following terms are defined or have meaning as described below. Computer software, which may be, hereinafter, simply referred to as "software", is defined as a program related to operation of a computer or any data to be used in processing performed by a computer according to such a program. "Application software", which may be simply referred to as "application", is a general term for any software used to perform certain processing. "Firmware" is software for controlling hardware embedded in an electronic apparatus (device). "Widget" is software of single function that is generated by displaying any function, operating for any function, or displaying and operating any function. "Operating system", which is hereinafter simply referred to as an "OS", is software for controlling a computer, such that software, such as an application, is able to use computer resource. The operating system controls basic operation of the computer such as input or output of data, management of hardware such as a memory or a hard disk, or processing to be executed. Application software operates by utilizing functions provided by the operating system. "Program" is defined as a set of instructions for causing a computer to perform processing to have a certain result. While data to be used in processing according to the program is not a program itself, such data may define processing to be performed by the program such that it may be interpreted as equivalent to the program. For example, a data structure, which is a logical structure of data described by an interrelation between data elements, may be interpreted as equivalent to the program.

In the following description, a multifunction peripheral (MFP), which is an example of an image forming apparatus, is used as an electronic apparatus according to the present disclosure, but the present disclosure is not limited to the example. For example, the electronic apparatus according to some embodiments may be an information processing device such as a smartphone, a mobile phone, and a personal computer (PC), an electronic device for consumers, a shared terminal installed in an office or a work site, an industrial machine, an embedded machine, or a medical device. Note that the MFP is a device having a plurality of different functions such as a copier function, a scanner function, a printer function, and a facsimile communication function.

Overall Configuration of Information Processing System

FIG. 1 is a diagram illustrating an example of an overall configuration of an information processing system according to one or more embodiments of the disclosure. A description is given of an overall configuration of an information processing system 1 according to the present embodiment with reference to FIG. 1.

As illustrated in FIG. 1, the information processing system 1 includes, for example, an MFP 10, an application market server 20 (an example of an external server, an example of a server device), a contract management server 30, a common management server 40, an application management server 50, and a firmware management server 60. The above-mentioned servers and devices (apparatuses) are able to communicate with each other through a network N. Each of the application market server 20, the contract management server 30, the common management server 40, the application management server 50, and the firmware management server 60 provide cloud services according to corresponding processing.

The MFP 10 is an image forming apparatus (an example of an electronic apparatus) having, for example, a printer function that performs print output (image forming) based on print data. In addition, the MFP 10 is an example of a target apparatus on which an application (hereinafter, may be simply referred to as an app) or firmware is to be installed.

The application market server 20 is a server that provides a cloud service by an application market site that provides the MFP 10 with information on one or more applications and/or firmware that are/is able to be installed (installable) on an information processing apparatus such as the MFP 10. The one or more applications and/or firmware are/is software, and information on the one or more applications and/or firmware is information related to the software. In addition, the software including an application and firmware, is downloadable on an information processing apparatus (electronic apparatus), such as the MFP 10, through a network for installation. As such applications, which are able to be installed on the information processing apparatus such as the MFP 10, include, for example, a native application (hereinafter, may be referred to as a "native app") and a web application (hereinafter, may be referred to as a "web app"). The native application is an application that is installed on and used with the information processing apparatus. The web application is a program executed on a web server, and is an application used on a browser in cooperation with the operation of a program (script or the like) operating on the browser on the information processing apparatus.

The contract management server 30 is a server that manages information on applications and/or firmware, which are items of trade. The information managed by the contract management server 30 includes, for example, an application name, a firmware name, content, and a price.

The common management server 40 is a server that manages contractors who are customers, manages accounts, and performs authentication processing, for example.

The application management server 50 is a server that holds (retains, stores) an actual file of an application that is able to be installed (installable) on an information processing apparatus such as the MFP 10 (hereinafter, may be referred to as an application object) and distributes the application object in response to a request from the MFP 10. Specifically, the applications corresponding to the application objects held by the application management server 50 are native applications.

The firmware management server 60 is a server that holds (retains, stores) an actual file of firmware (including an OS) that is able to be installed (installable) on an information processing apparatus such as an MFP 10 and distributes the actual file of the firmware in response to a request from the MFP 10.

In FIG. 1, the application management server 50 that manages the applications and the firmware management server 60 that manages the firmware are servers separated from each other, but the present disclosure is not limited to the example of FIG. 1. In one or more embodiments, the applications and the firmware are managed by the same server. In addition, in FIG. 1, the application market server 20, which provides the information on the applications, and the application management server 50, which manages the applications, are servers separated from each other, but the present disclosure is not limited to the example of FIG. 1. In one or more embodiments, the information on the applications and the applications are managed by the same server. In addition to the information on the applications and the applications, the firmware, which is managed by the firmware management server 60 in FIG. 1, may also be managed by the same server in one or more embodiments. Although the overview of the operation of each server illustrated in FIG. 1 is described above, but this is not limiting. In one or more embodiments, the operation of each of the servers may be performed by one of the other servers. In addition, one of the servers may be implemented by being distributed to a plurality of servers. For example, a service provided by the application market site is not limited to being implemented by a single application market server 20. That is, the service may be implemented by being distributed to a plurality of servers, for example.

Hardware Configuration of MFP

Figure 2:
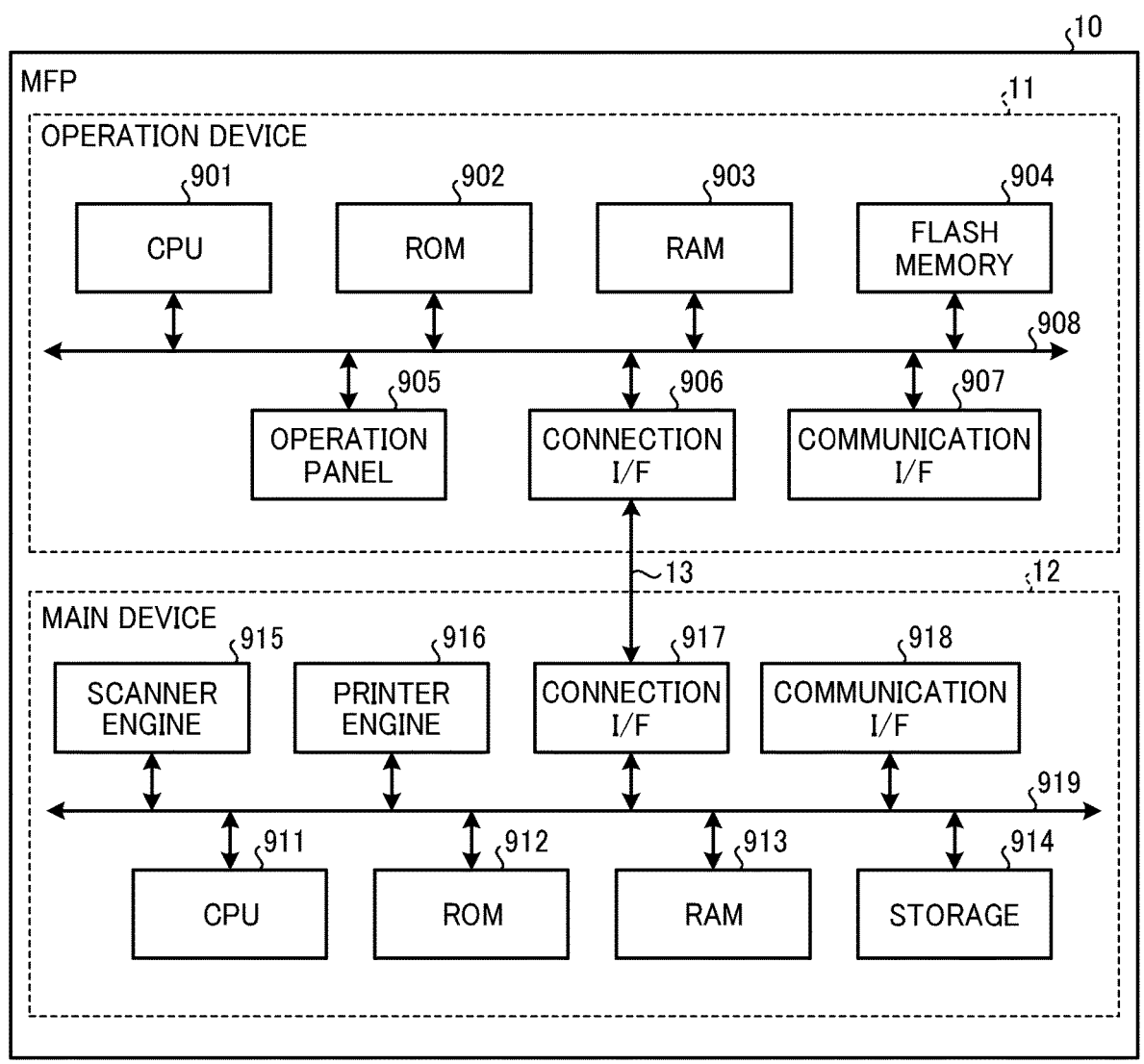
FIG. 2 is a block diagram illustrating an example of a hardware configuration of a multifunction peripheral (MFP) according to one or more embodiments of the disclosure.

FIG. 2 is a block diagram illustrating an example of a hardware configuration of an MFP according to the present embodiment of the disclosure. The hardware configuration of the MFP 10 according to the present embodiment is described below with reference to FIG. 2.

As illustrated in FIG. 2, the MFP 10 includes, for example, an operation device 11 that receives user operations and a main device 12 implements various image forming functions such as a scanner function and a printer function. Receiving a user operation means receiving information or data that is input according to a user operation. Such information or data includes signals indicating values of coordinates on a screen, for example.

The operation device 11 and the main device 12 are connected to each other so as to communicate with each other through a dedicated communication path 13. The communication path 13 may be one in compliance with a universal serial bus (USB) standard, but this is not limiting on the disclosure. In some embodiments, the communication path 13 may be another one in compliance with any standard, regardless of wired or wireless. The main device 12 operates according to an operation received by the operation device 11. Further, the main device 12 is capable of communicating with an external device so that operates according to an instruction received from the external device.

Hardware Configuration of Operation Device

As illustrated in FIG. 2, the operation device 11 includes, for example, a central processing unit (CPU) 901, a read only memory (ROM) 902, a random access memory (RAM) 903, a flash memory 904, an operation panel 905, a connection interface (I/F) 906, a communication I/F 907, and a bus 908.

The CPU 901 is a processor that comprehensively controls the operation of the operation device 11. The CPU 901 executes a program stored in, for example, the ROM 902 or the flash memory 904 using the RAM 903 as a work area, to control the operation device 11. For example, the CPU 901 implements various functions including displaying on the operation panel 905 information (an image) according to an input received from a user.

The ROM 902 is a non-volatile memory that stores, for example, a Basic Input/output System (BIOS) to be executed at start-up of the operation device 11 and various settings. The RAM 903 is a volatile memory used as a work area of the CPU 901. The flash memory 904 is a non-volatile storage device that stores, for example, an operating system (OS), application programs, and various types of data.

The operation panel 905 includes an input function that receives various inputs according to user operations and a display function that displays various information (for example, information corresponding to the received operation, information indicating an operation status of the MFP 10, and a setting screen). The operation panel 905 includes, for example, a liquid crystal display device (LCD) implementing a touch panel function. Note that the operation panel 905 is not limited to the liquid crystal display device, and may include a display device of an organic electroluminescence (EL) implementing a touch panel function, for example. In addition to or in alternative to the touch panel function, the operation panel 905 may be provided with an operation unit such as a hardware key or a display unit such as a lamp.

The connection I/F 906 is an interface for communicating with the main device 12 through the communication path 13.

The communication I/F 907 is a network interface for connecting the operation device 11 to the network N and communicating with an external device connected to the network N. The communication I/F 907 is, for example, an interface compliant with Ethernet (registered trademark) and is capable of establish communications in compliance with Transmission Protocol (TCP)/Internet Protocol (IP).

The bus 908 is a transmission line that is connected to each of the above-described components and transfers address signals, data signals, and various types of control signals. Note that the hardware configuration of the operation device 11 illustrated in FIG. 2 is an example and may include components other than illustrated in FIG. 2.

Hardware Configuration of Main Device

As illustrated in FIG. 2, the main device 12 includes, for example, a CPU 911, a ROM 912, a RAM 913, a storage 914, a scanner engine 915, a printer engine 916, a connection I/F 917, a communication I/F 918, and a bus 919.

The CPU 911 is a processor that comprehensively controls the operation of the main device 12. The CPU 911 executes a program stored in, for example, the ROM 912 or the storage 914 using the RAM 913 as a work area, to control the main device 12. For example, the CPU 911 implements various functions such as a copier function, a scanner function, a facsimile communication function, and a printer function.

The ROM 912 is a non-volatile memory that stores, for example, a BIOS to be executed at start-up of the main device 12 and various settings. The RAM 913 is a volatile memory used as a work area of the CPU 911. The storage 914 is, for example, a non-volatile storage device that stores an OS, an application program, various data, or the like. The storage 914 includes, for example, a hard disk drive (HDD) and a solid state drive (SSD).

The scanner engine 915 is hardware that performs general-purpose information processing and processing other than communication in order to implement a scanner function that scans and reads a document as an image, among image forming functions. The printer engine 916 is hardware that performs general-purpose information processing and processing other than communication in order to implement a printer function that prints on a print medium such as a sheet of paper, among image forming functions.

The connection I/F 917 is an interface for communicating with the operation device 11 through the communication path 13.

The communication I/F 918 is a network interface for connecting the main device 12 to the network N and communicating with an external device connected to the network N. The communication I/F 918 is, for example, an interface compliant with Ethernet (registered trademark) and is capable of establish communications in compliance with TCP/IP.

The bus 919 is a transmission line that is connected to each of the above-described components and transfers address signals, data signals, and various types of control signals.

Note that the hardware configuration of the main device 12 illustrated in FIG. 2 is an example and may include components other than illustrated in FIG. 2. For example, the main device 12 may include a finisher that sorts printed print media, or a specific option such as an Auto Document Feeder (ADF) that automatically feeds a document.

Hardware Configuration of Application Market Server

Figure 3:
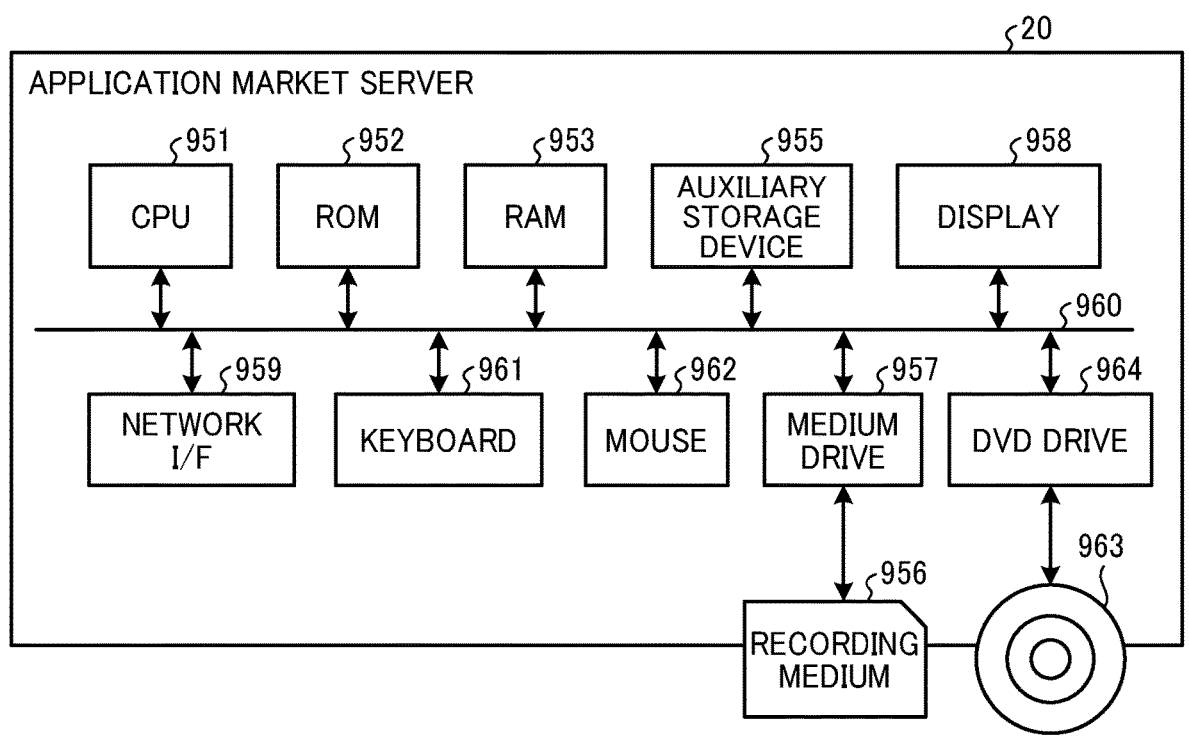
FIG. 3 is a diagram illustrating an example of a hardware configuration of an application market server according to one or more embodiments of the disclosure.

FIG. 3 is a diagram illustrating an example of a hardware configuration of the application market server 20 according to one or more embodiments of the disclosure. The hardware configuration of the application market server 20 according to the present embodiment is described below with reference to FIG. 3.

As illustrated in FIG. 3, the application market server 20 includes, for example, a CPU 951, a ROM 952, a RAM 953, an auxiliary storage device 955, a media drive 957, a display 958, a network I/F 959, a keyboard 961, a mouse 962, and a Digital Versailles Disc (DVD) drive 964.

The CPU 951 is a processor that comprehensively controls the operation of the application market server 20. The ROM 952 is a non-volatile storage device that stores a program for the application market server 20. The RAM 953 is a volatile storage device used as a work area of the CPU 951.

The auxiliary storage device 955 is a storage device such as an HDD or an SSD that stores an image or the like read by the scanning function by the MFP 10. The media drive 957 reads or writes (stores) data with respect to a recording medium 956, such as a flash memory, under control of the CPU 951.

The display 958 is a display device including a liquid crystal, an organic EL, or the like that displays various information such as a cursor, a menu, a window, characters, or an image.

The network I/F 959 is an interface for performing data communication with an external device such as the MFP 10 using the network N. The network I/F 959 is, for example, a Network Interface Card (NIC) compliant with Ethernet (registered trademark) and is capable of establish communications in compliance with TCP/IP.

The keyboard 961 is an input device used for selecting characters, numbers, various commands, moving a cursor, and the like. The mouse 962 is an input device used for selecting commands from options or executing commands, selecting a subject to be processed, moving a cursor, and the like.

The DVD drive 964 is a device that reads or writes data with respect to a DVD 963 such as a DVD-ROM or a Digital Versailles Disc Recordable (DVD-R), which is an example of a removable storage medium (recording medium).

The CPU 951, the ROM 952, the RAM 953, the auxiliary storage device 955, the media drive 957, the display 958, the network I/F 959, the keyboard 961, the mouse 962, and the DVD drive 964 are connected to each other to enable communication through a bus line 960 such as an address bus or a data bus.

Note that the hardware configuration of the application market server 20 illustrated in FIG. 3 is an example and may not include all the components illustrated in FIG. 3 or may include other components.

Although being described as the hardware configuration of the application market server 20 in the above-description, the hardware configuration illustrated in FIG. 3 also applies to each of the contract management server 30, the common management server 40, the application management server 50, and the firmware management server 60.

Software Configuration of Information Processing System

Figure 4:
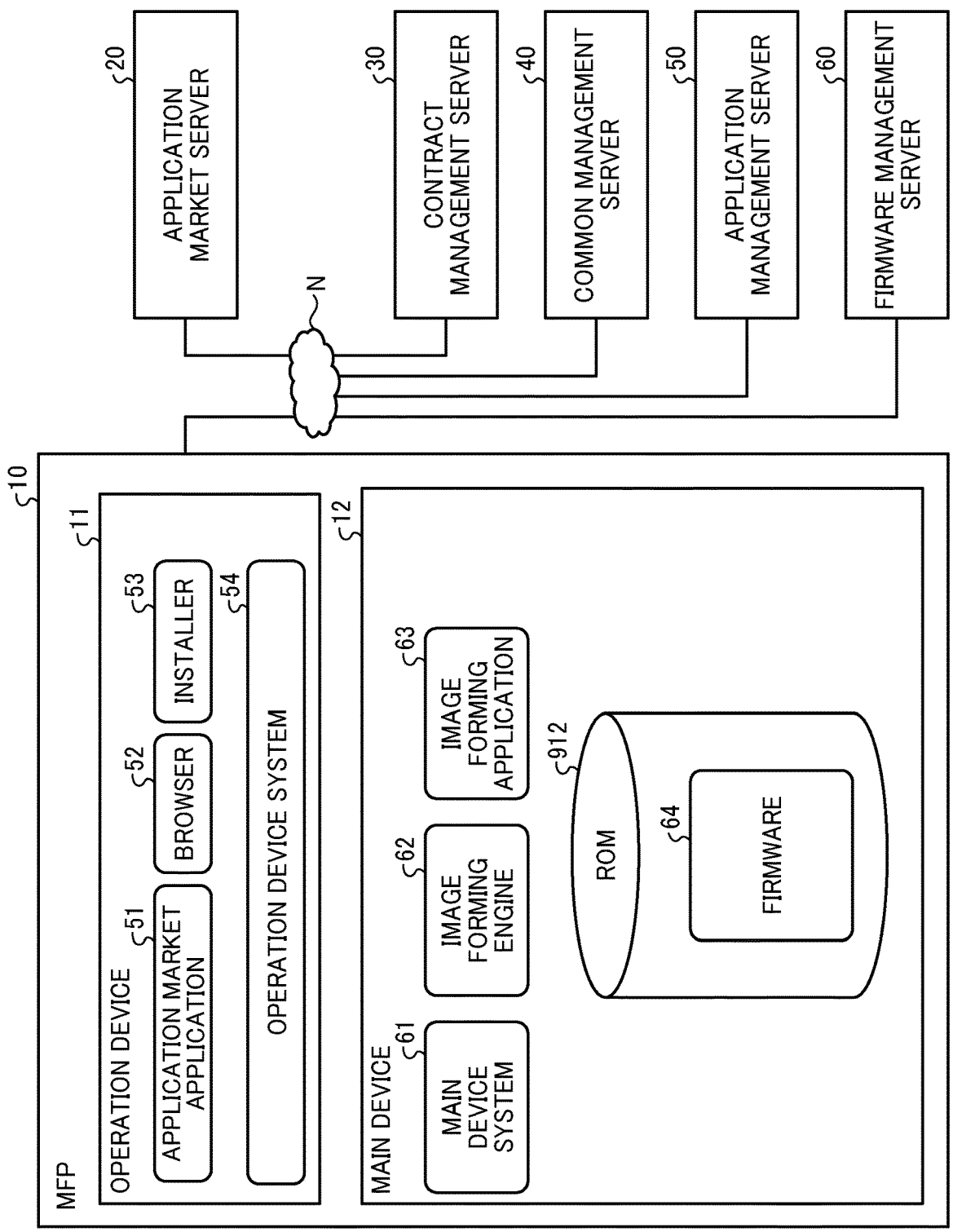
FIG. 4 is a diagram illustrating an example of a software configuration of an image processing system according to one or more embodiments of the disclosure.

FIG. 4 is a diagram illustrating an example of a software configuration of an image processing system according to one or more embodiments of the disclosure. A description is given below of a functional configuration of the information processing system 1 according to the present software with reference to FIG. 4.

As illustrated in FIG. 4, the operation device 11 includes, for example, an application market application 51, a browser 52, an installer 53, and an operation device system 54.

The application market application 51 is an application that communicates with an application market site provided by the application market server 20 via the browser 52 and acquires, according to a user operation, for example, a list of applications or firmware that are or is able to be installed on the MFP 10.

The browser 52 is software that implements a function such as a web application by acquiring, from the application market server 20, web content (for example, Hypertext Markup Language (HTML), Cascading Style Sheets (CSS), JavaScript (registered trademark), various electronic files).

The installer 53 is a module that downloads, from the application management server 50 or the firmware management server 60, an application (native application) or an actual file of firmware (object file) to be installed on the operation device 11 or the main device 12.

The operation device system 54 is software that controls the operation device 11. The operation device system 54 controls the application market application 51, the browser 52, and the installer 53.

In addition, as illustrated in FIG. 4, the main device 12 includes a main device system 61, an image forming engine 62, and an image forming application 63.

The main device system 61 is software that controls the main device 12. The image forming engine 62 corresponds to the scanner engine 915 and the printer engine 916, which are described above. The image forming application 63 is an application that controls the image forming engine 62. For example, the image forming application 63 includes a copy application, a scanner application, a facsimile application, a printer application, and the like.

Further, as illustrated in FIG. 4, the ROM 912 stores firmware (firmware 64 in FIG. 4) downloaded from the firmware management server 60. For example, the ROM 912 includes a non-operating area for temporarily storing the firmware and holding the firmware in a non-executable state, and an operating area for storing the firmware that actually controlling the operation device 11 and the main device 12.

Then, when the MFP 10 is started, the firmware stored in the non-operating area is copied to the operating area and executed.

Functional Block Configuration of Information Processing System

Figure 5:
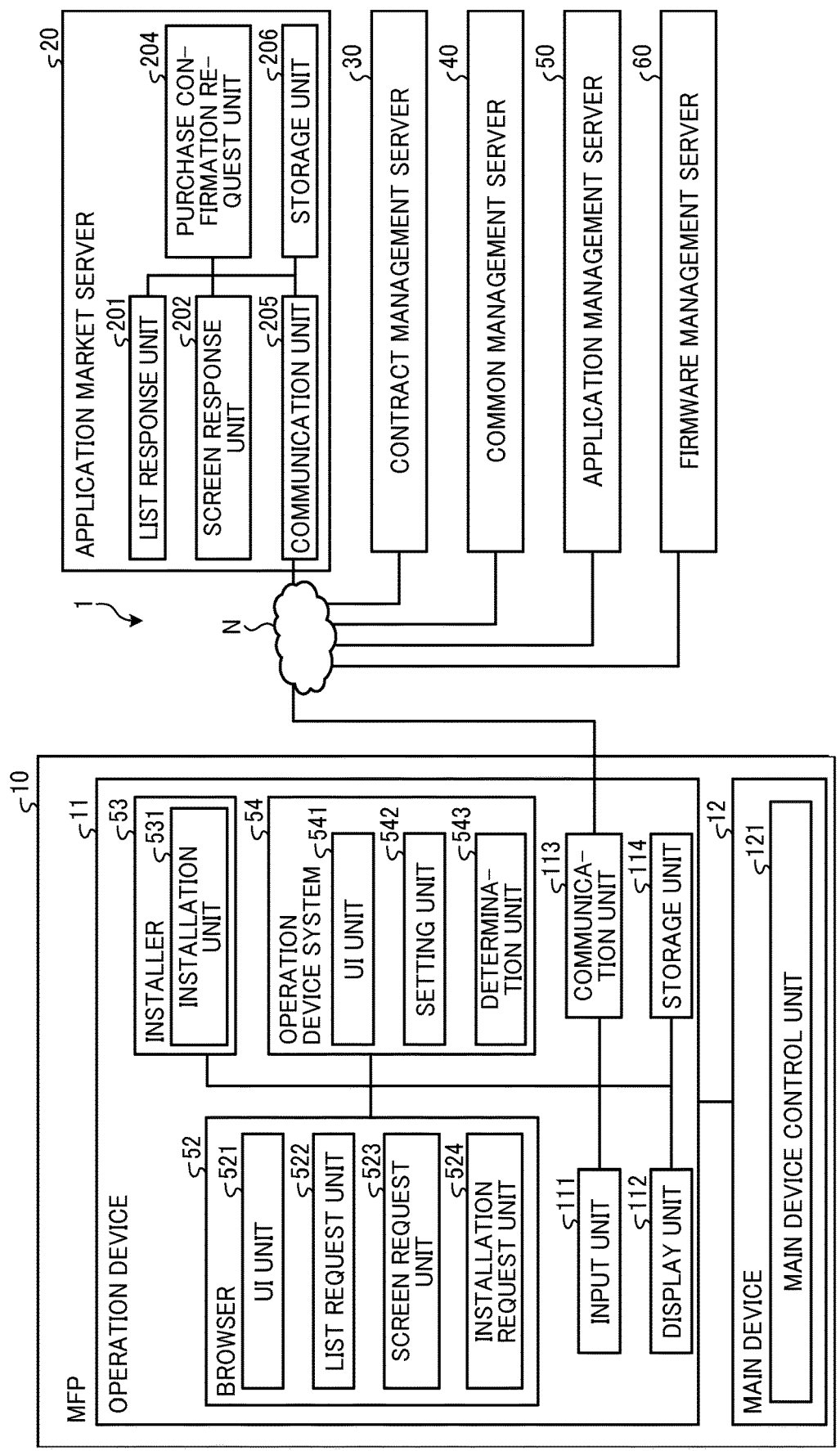
FIG. 5 is a diagram illustrating an example of a functional configuration of an information processing system according to one or more embodiments of the disclosure.

FIG. 5 is a diagram illustrating an example of a functional configuration of an information processing system according to one or more embodiments of the disclosure. A description is given below of a functional configuration of the information processing system 1 according to the present with reference to FIG. 5.

As illustrated in FIG. 5, the operation device 11 of the MFP 10 according to the present embodiment includes, for example, a User Interface (UI) unit 521, a list request unit 522 (request unit), a screen request unit 523, an installation request unit 524, an installation unit 531, a UI unit 541 (an example of a display control unit), a setting unit 542, a determination unit 543, an input unit 111, a display unit 112, a communication unit 113 (acquisition unit), and a storage unit 114.

The UI unit 521 is a functional unit that causes the display unit 112 to display a web page or the like corresponding to the content acquired from the application market server 20 or the like. For example, the UI unit 521 causes the display unit 112 to display, for example, an initial guidance screen, an automatic display setting screen, and a notification screen, which are be described later. Further, the UI unit 521 receives various operations (for example, pressing a link) on the web page by a user operation of inputting to the input unit 111. The UI unit 521 is implemented by the CPU 901 of the operation device 11 illustrated in FIG. 2 executing the browser 52.

The list request unit 522 is a functional unit that requests the application market server 20 to provide information on a list related to applications and/or firmware that are/is able to be installed on the MFP 10 in response to a user operation of inputting to the input unit 111. The list request unit 522 requests the application market server 20 to provide the list at a time when an application site button 1002 on a home screen 1000 is pressed, but this is not the limiting on the disclosure. As described later, the list request unit 522 may transmit a request for the list at a time when a notification screen 1300 is displayed and acquire a notification information on applications or firmware notified on the notification screen 1300 through the communication unit 113. The list request unit 522 is implemented by the CPU 901 of the operation device 11 illustrated in FIG. 2 executing the browser 52.

The screen request unit 523 is a functional unit that requests various screen information to be displayed on the display unit 112 from the application market server 20 in response to a user operation of inputting to the input unit 111. The screen request unit 523 is implemented by the CPU 901 of the operation device 11 illustrated in FIG. 2 executing the browser 52.

The installation request unit 524 is a functional unit that requests the application management server 50 or the firmware management server 60 to install a specified application or firmware in response to the user operation of inputting to the input unit 111. The installation request unit 524 is implemented by the CPU 901 of the operation device 11 illustrated in FIG. 2 executing the browser 52.

The installation unit 531 is a functional unit that installs using an object file of an application (native application) downloaded from the application management server 50 or an object file of firmware downloaded from the firmware management server 60. The installation unit 531 is implemented by the CPU 901 of the operation device 11 illustrated in FIG. 2 executing the installer 53.

The UI unit 541 is a functional unit that causes the display unit 112 to display a screen (for example, a home screen, which is described later) for performing various types of operation of the MFP 10. The UI unit 541 is implemented by the CPU 901 of the operation device 11 illustrated in FIG. 2 executing the operation device system 54.

The setting unit 542 is a functional unit that makes various settings according to a user operation of inputting to the input unit 111 on various setting screens (for example, an automatic display setting screen, which is described later) displayed by the display unit 112. The setting unit 542 is implemented by the CPU 901 of the operation device 11 illustrated in FIG. 2 executing the operation device system 54.

The determination unit 543 is a functional unit that determines which screen to be displayed or to which screen a current screen transitions according to authentication settings or authority of a logged-in user. The determination unit 543 is implemented by the CPU 901 of the operation device 11 illustrated in FIG. 2 executing the operation device system 54.

The input unit 111 is a functional unit that receives an input operation performed by a user. The input unit 111 is implemented by an input function of the operation panel 905 illustrated in FIG. 2.

The display unit 112 is a functional unit that displays various information according to a command of the UI unit 521 and the UI unit 541. The display unit 112 is implemented by a display function of the operation panel 905 illustrated in FIG. 2.

The communication unit 113 is a functional unit that performs data communication with various servers through the network N under the control of the browser 52. The communication unit 113 is implemented by executing a program by the CPU 901 illustrated in FIG. 2 and the communication I/F 907 illustrated in FIG. 2.

The storage unit 114 is a functional unit that stores various types of data. For example, the storage unit 114 stores setting information set on an automatic display setting screen or a setting screen, which is described later. The storage unit 114 is implemented by the RAM 903 or the flash memory 904 illustrated in FIG. 2.

Further, as illustrated in FIG. 5, the main device 12 of the MFP 10 according to the present embodiment includes a main device control unit 121.

The main device control unit 121 is a functional unit that controls the main device 12. The main device control unit 121 is implemented by the CPU 911 of the main device 12 illustrated in FIG. 2 executing the main device system 61.

Further, each functional unit of the operation device 11 and the main device 12 of the MFP 10 illustrated in FIG. 5 conceptually represent a function and is not limited to such a configuration. For example, a plurality of functional units, each of which is illustrated as an independent unit of the MFP 10 in FIG. 5, may be collectively configured as one functional unit. In addition or alternatively, one or more of the plurality of functional units of the MFP 10 illustrated in FIG. 5 may be divided into a plurality of functional units.

Further, for example, in the operation device 11, the functional unit implemented by the browser 52 and the functional unit implemented by the operation device system 54 may not be necessarily distinguished from each other, and the functional unit implemented by the browser 52 may be implemented by the operation device system 54, and vice versa. In addition, software different from the browser 52 and the operation device system 54 may implement each functional unit.

As illustrated in FIG. 5, the application market server 20 according to the present embodiment includes a list response unit 201 (response unit), a screen response unit 202, a purchase confirmation request unit 204, a communication unit 205, and a storage unit 206.

The list response unit 201 generates a list of information on applications and/or firmware that are/is able to be installed on the MFP 10 in response to a request from the list request unit 522 of the MFP 10, and transmits the list to the MFP 10 via the communication unit 205. The list response unit 201 is implemented by the CPU 951 illustrated in FIG. 3 executing a program.

The screen response unit 202 is a functional unit that transmits information on various screens (for example, an installation screen, which is described later) to the MFP 10 via the communication unit 205 in response to a request from the screen request unit 523 of the MFP 10. The screen response unit 202 is implemented by the CPU 951 illustrated in FIG. 3 executing a program.

The purchase confirmation request unit 204 is a functional unit that requests the contract management server 30 to check whether a specified application or firmware is purchased, in response to a request received from the installation request unit 524 of the MFP 10 for installation of the specified application or firmware. The purchase confirmation request unit 204 is implemented by the CPU 951 illustrated in FIG. 3 executing a program.

The communication unit 205 is a functional unit that performs data communication with the MFP 10 or the contract management server 30 through the network N. The communication unit 205 is implemented by executing a program by the CPU 951 illustrated in FIG. 3 and the network I/F 959 illustrated in FIG. 3.

The storage unit 206 is a functional unit that stores, for example, information on applications or firmware that are or is able to be installed on various electronic apparatuses or devices such as the MFP 10. The storage unit 206 is implemented by the auxiliary storage device 955 illustrated in FIG. 3, for example.

Further, each functional unit of the application market server 20 illustrated in FIG. 5 conceptually illustrates a function and is not limited to such a configuration. For example, a plurality of functional units, each of which is illustrated as an independent unit of the application market server 20 in FIG. 5, may be collectively configured as one functional unit. In addition or alternatively, one or more of the plurality of functional units of the application market server 20 illustrated in FIG. 5 may be divided into a plurality of functional units.

Further, among the functional units in the MFP 10 or the application market server 20 illustrated in FIG. 5, the functional units that are implemented by executing various software are not limited to this, and at least one of such the functional units may be implemented by a dedicated hardware circuit (integrated circuit, for example).

Example of Screen Transitions related to Notification Screen in MFP

Figure 6:
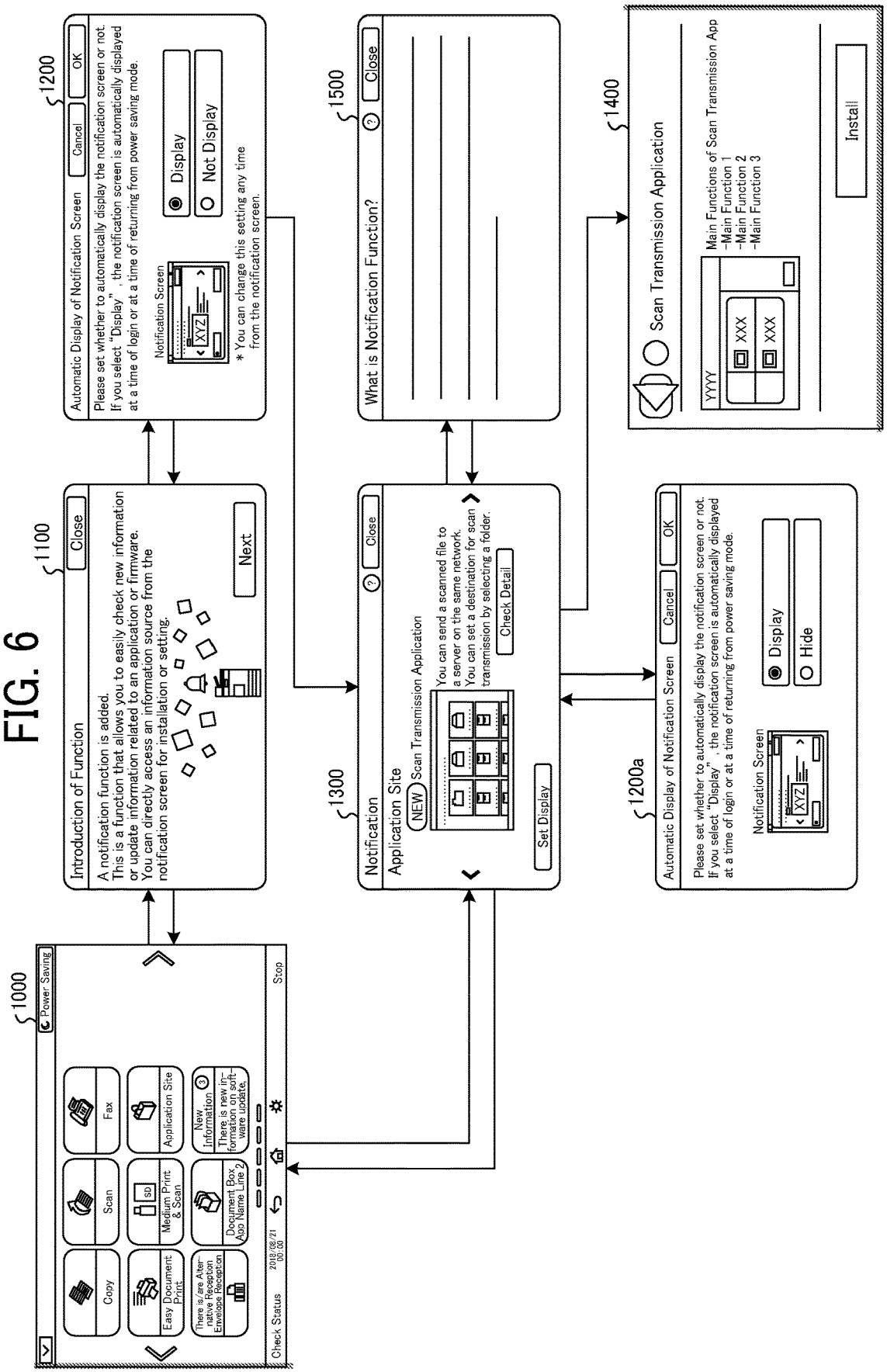
FIG. 6 is a diagram illustrating an example of screen transitions related to a notification screen according to one or more embodiments of the disclosure.
Figure 7:
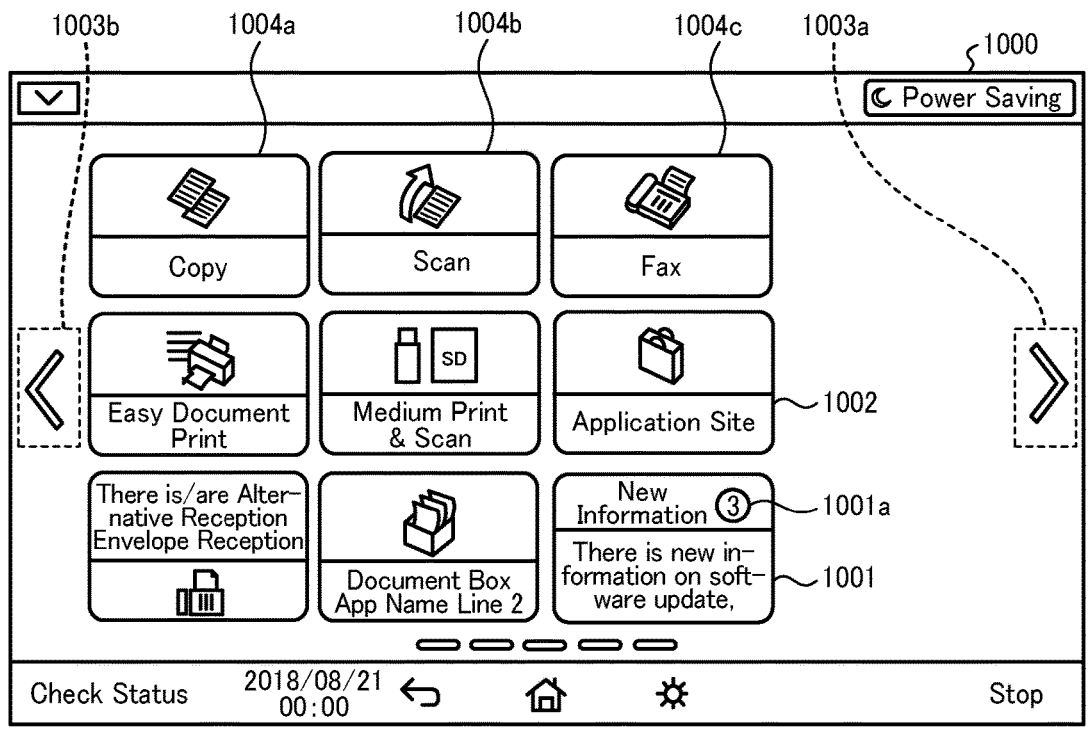
FIG. 7 is a diagram illustrating an example of a home screen, according to one or more embodiments of the disclosure.
Figure 8:
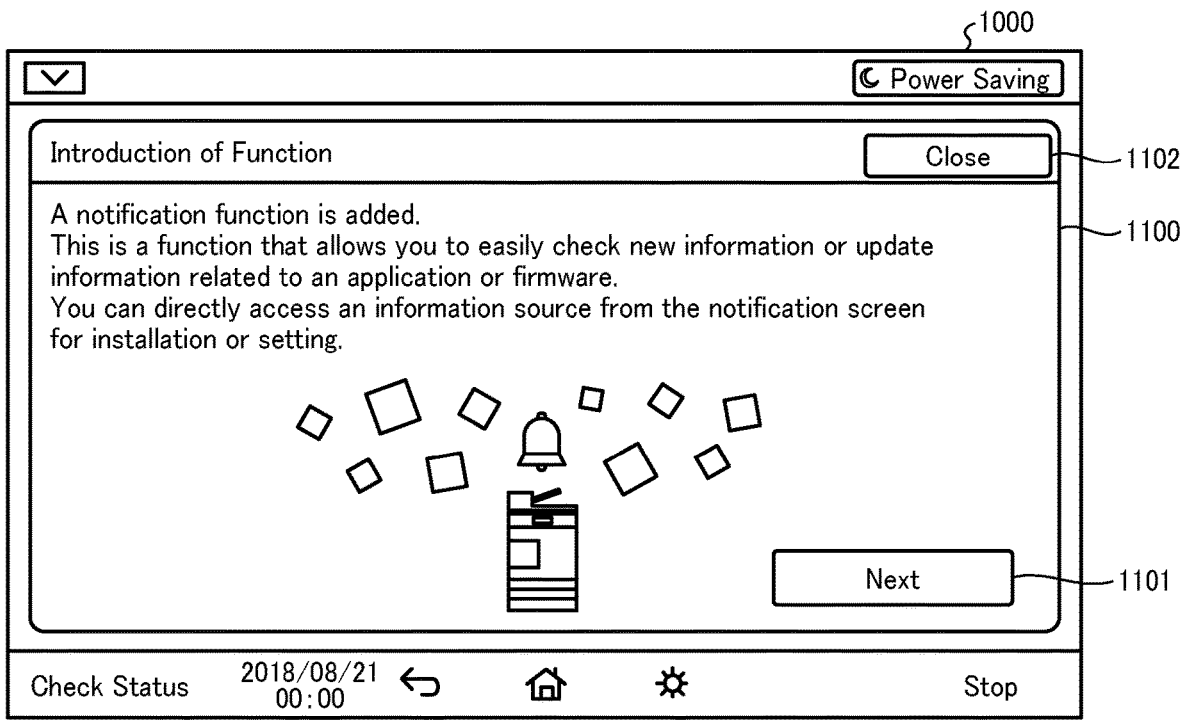
FIG. 8 is a diagram illustrating an example of an initial guidance screen according to one or more embodiments of the disclosure.
Figure 9:
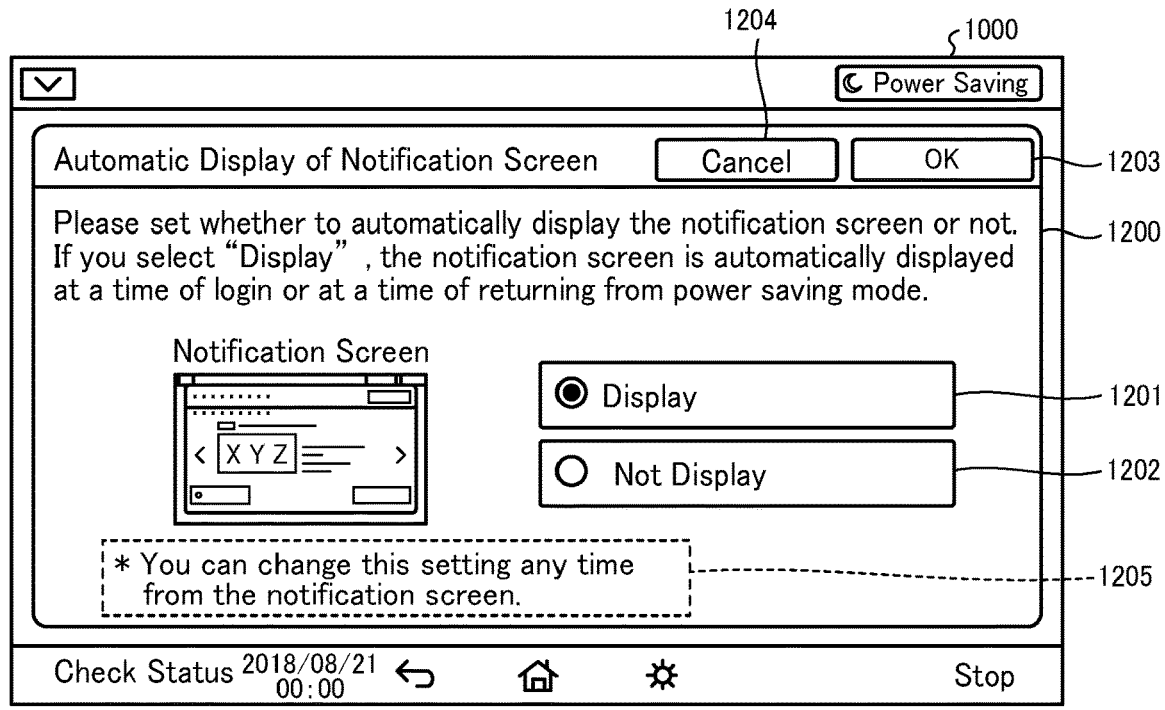
FIG. 9 is a diagram illustrating an example of an automatic display setting screen at a time of an initial guidance, according to one or more embodiments of the disclosure.
Figure 10:
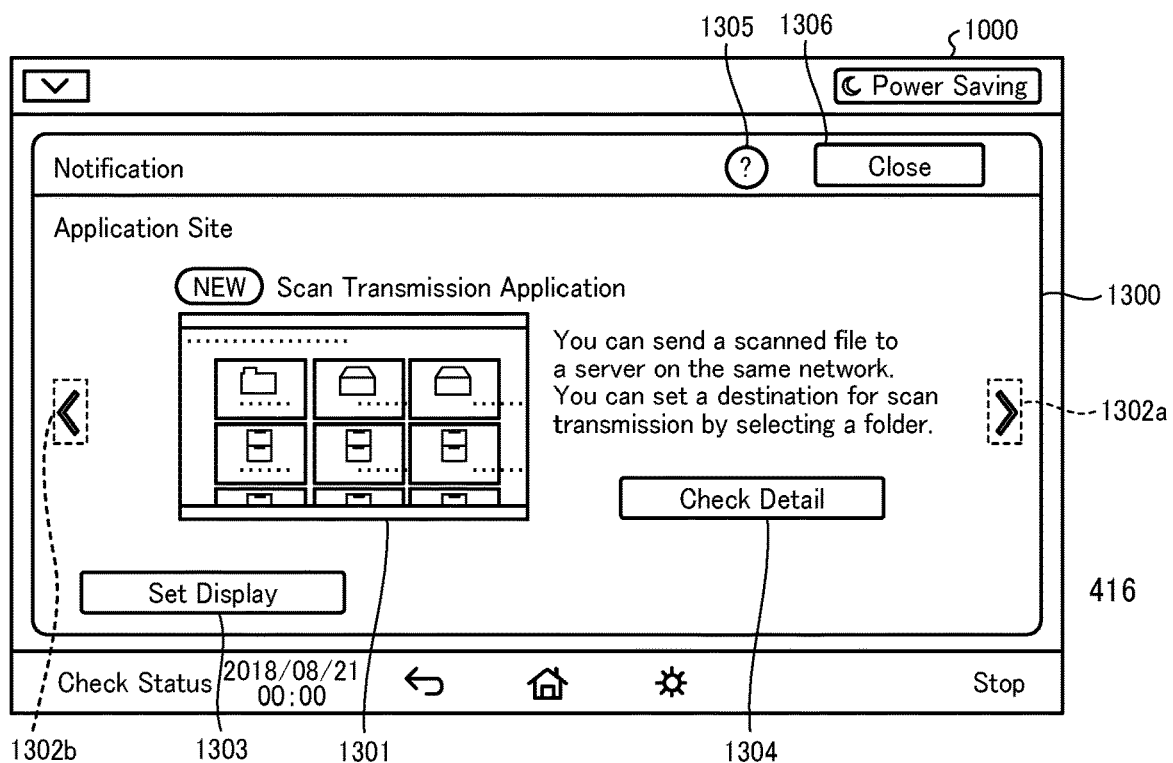
FIG. 10 is a diagram illustrating an example of a notification screen according to one or more embodiments of the disclosure.
Figure 11:
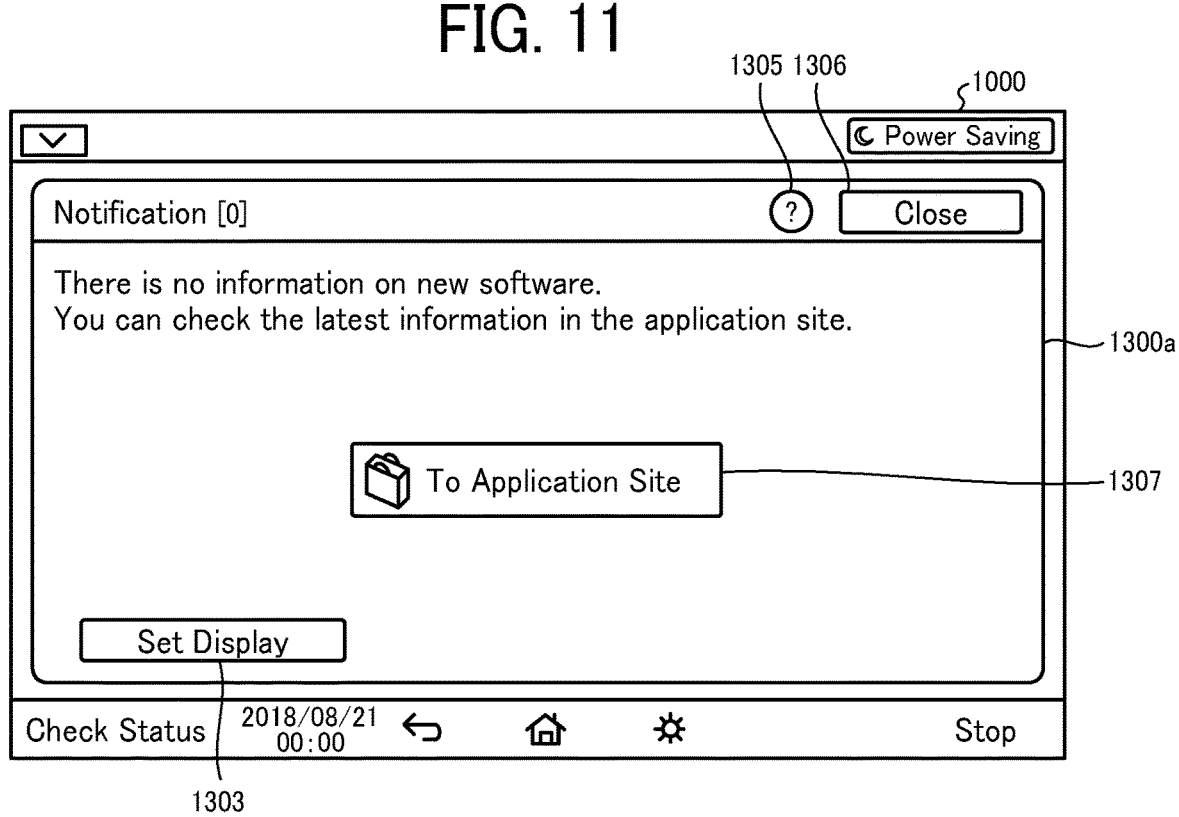
FIG. 11 is a diagram illustrating an example of a notification screen that is displayed when there is no notification, according to one or more embodiments of the disclosure.
Figure 12:
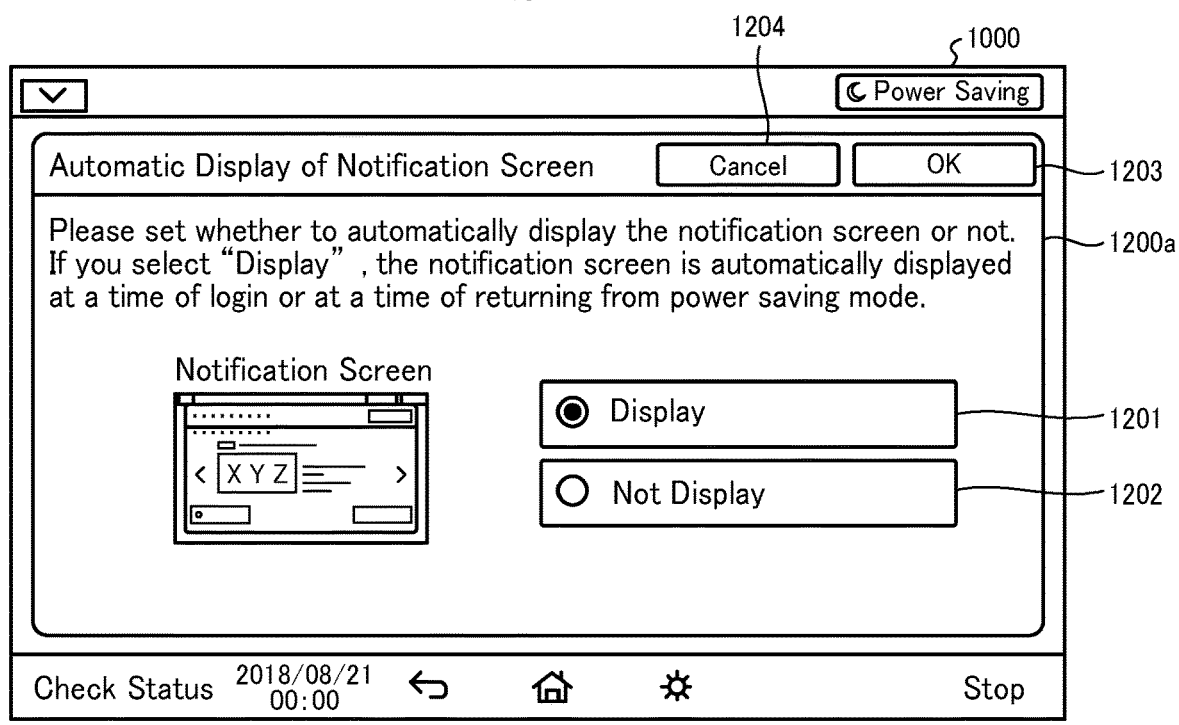
FIG. 12 is a diagram illustrating an example of an automatic display setting screen according to one or more embodiments of the disclosure.
Figure 13:
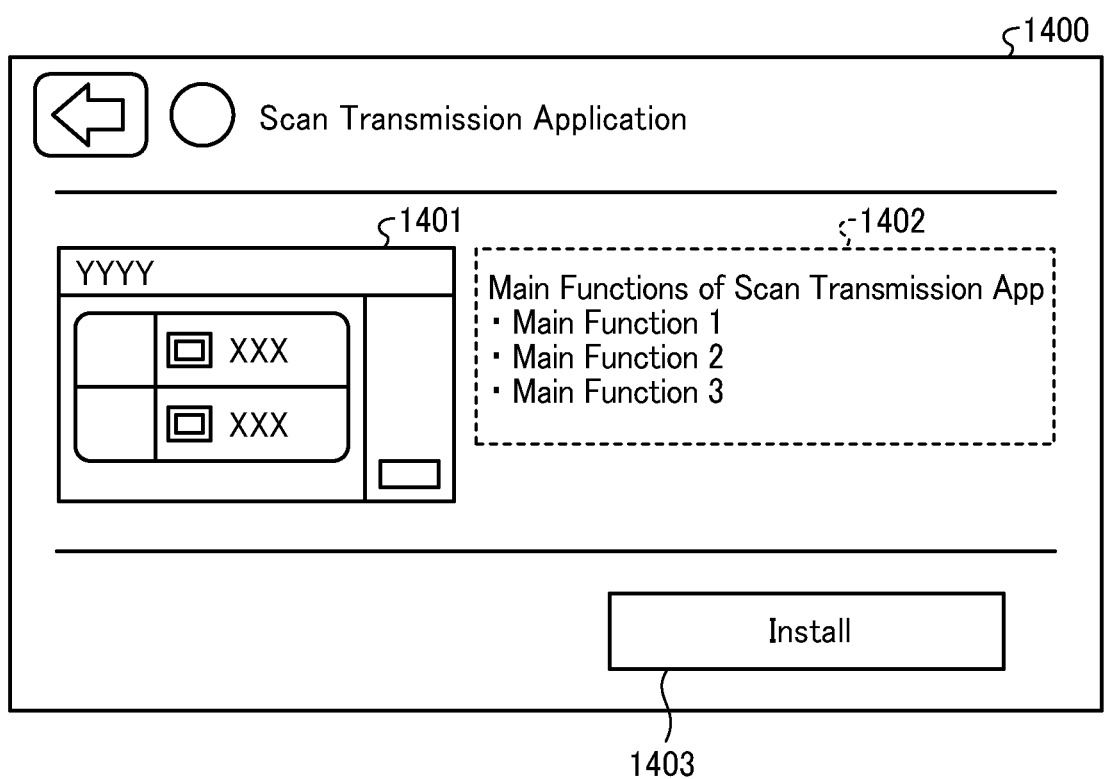
FIG. 13 is a diagram illustrating an example of an installation screen according to one or more embodiments of the disclosure.

FIG. 6 is a diagram illustrating an example of screen transitions related to a notification screen according to one or more embodiments of the present disclosure. FIG. 7 is a diagram illustrating an example of a home screen according to one or more embodiments of the present disclosure. FIG. 8 is a diagram illustrating an example of an initial guidance screen according to one or more embodiments of the present disclosure. FIG. 9 is a diagram illustrating an example of an automatic display setting screen at a time of an initial guidance, according to one or more embodiments of the present disclosure. FIG. 10 is a diagram illustrating an example of a notification screen according to one or more embodiments of the present disclosure. FIG. 11 is a diagram illustrating an example of a notification screen that is displayed when there is no notification, according to one or more embodiments of the present disclosure. FIG. 12 is a diagram illustrating an example of an automatic display setting screen according to one or more embodiments of the present disclosure. FIG. 13 is a diagram illustrating an example of the installation screen according to one or more embodiments of the present disclosure. A description is given below of a flow of a screen transition related to a notification screen in the MFP 10 according to the present embodiment with reference to FIG. 6 to FIG. 13.

Referring to FIG. 6, as an example, a transition operation that starts from the home screen 1000 to the notification screen 1300, which is for notifying (displaying a notice of) applications or firmware that are or is able to be installed on the MFP 10, is described below. The home screen 1000 illustrated in FIG. 7 is a screen that serves as a starting point for operating the MFP 10 and is a screen on which buttons for performing various operations are arranged. As illustrated in FIG. 7, the home screen 1000 includes a notification widget 1001, an application site button 1002, a forward button 1003a, a back button 1003b, a copy button 1004a, a scan button 1004b, and a fax button 1004c.

The notification widget 1001 is a widget that notifies a user of information indicating that there are one or more applications or firmware that are or is able to be installed on the MFP 10 when there are such applications or firmware. In addition, the notification widget 1001 notifies the information as notification information. As illustrated in FIG. 7, the notification widget 1001 includes an update number display part 1001a indicating the number of applications or firmware that are or is able to be installed on the MFP 10, namely the number of updates that is ready to be performed. The notification widget 1001 acquires information periodically via the application market application 51 from the application market server 20, and thereby the number of updates and the notification information are displayable by the notification widget 1001. The notification information displayed by the notification widget 1001 on the home screen 1000 allows the user to check the information to know that there is one or more applications or firmware that are or is able to be installed on the MFP 10. Note that the notification widget 1001 may acquire information not only from the application market application 51 but also from other applications of the MFP 10 or a cloud service. For example, information on errors occurring in the MFP 10 or information on shortage of consumables, which is acquired from other applications, is obtainable and displayable. In addition, for example, information on consumable delivery, contract information, signage or advertising information, or internal notification information, which is acquired from cloud services is obtainable and displayable. Such the acquired information may be sequentially displayed by changing an image of an icon of the notification widget 1001 at regular intervals. The notification widget 1001 may operate on the operation device system 54 as one application (notification widget application). Alternatively, the notification widget 1001 may function as a part of the operation device system 54. Further, the notification widget 1001 is included in a firmware package (in which an update file of main device firmware and an update file of the operation device system are packaged) by update of the firmware of the MFP 10, and is downloaded by the MFP 10 to be installed on the operation device 11 and the main device 12, and thereby a function is added to the operation device 11 of the MFP 10. When the notification widget 1001 is operated for the first time after the function of the notification widget 1001 is added by the update of the firmware, an initial guidance, which is described later, is displayed. The notification widget 1001 is automatically added as an icon on the home screen of the operation device 11 after the firmware is updated, and thereby the function is appropriately introduced to the user (administrator, for example) of the MFP 10 and the user is guided in an easy-to-understand manner. In addition, the home screen 1000 is one example of a predetermined screen (pre-set screen) on which the notification widget 1001 may be displayed.

The application site button 1002 is a button for displaying a list screen (described later) indicating a list of applications and/or firmware that are able to be installed on the MFP 10. The application site button 1002 functions as an icon of the application market application 51.

The forward button 1003a is a button for displaying a next screen as the home screen 1000. The back button 1003a is a button for displaying a previous screen as the home screen 1000.

The copy button 1004a is a button for performing a copy process. The scan button 1004b is a button for performing a scan process. The fax button 1004c is a button for performing a facsimile communication process.

The notification widget 1001 for displaying the notification information is arranged on the home screen 1000, but the present disclosure is not limited to this, and may be arranged on another screen.

When the notification widget 1001 of the home screen 1000 is pressed by the user via the input unit 111, and when the determination unit 543 determines that the user who is currently logs in has authority as an administrator, that another screen having a priority higher than the notification screen 1300 is not currently displayed, and that the initial guidance is not checked (confirmed) in the past, the UI unit 541 causes the display unit 112 to display the initial guidance screen 1100 as illustrated in FIG. 6.

The initial guidance screen 1100 (guidance screen) as illustrated in FIG. 8 is a screen that displays an introduction of a feature overview including a displaying function of the notification information of the notification widget 1001 and a displaying function, on the notification screen 1300, of a function of an application or firmware that is installable (hereinafter, may be referred to as a notification function). Checking the initial guidance screen 1100 allows the user to know the outline of the notification function in advance. In addition, an application that implements the above-described feature, which includes the displaying function of the notification information of the notification widget 1001 and the displaying function, on the notification screen 1300, of a function of an application or firmware that is installable (notification function), is introduced on the MFP 10, as a new function, in a manner that an object file is downloaded from the application management server 50 or is included in the firmware downloaded from the firmware management server 60, for example. As illustrated in FIG. 8, the initial guidance screen 1100 includes a Next button 1101 and a Close button 1102.

The Next button 1101 is a button for displaying the automatic display setting screen 1200 as an initial guidance. The Close button 1102 is a button for closing the initial guidance screen 1100 and returning to the home screen 1000.

When the user presses the Next button 1101 of the initial guidance screen 1100 via the input unit 111, the UI unit 541 causes the display unit 112 to display the automatic display setting screen 1200 as the initial guidance as illustrated in FIG. 6. The initial guidance (initial guidance screen) is not limited to the notification function and may display an outline of a new function or functions of an application added to the MFP 10 by updating the firmware or the like, for example. For example, when the user or the administrator activates, for the first time, a new function or a new application included in software (application, firmware) introduced in the notification widget 1001 after downloading and installing the software on the MFP 10 via the application market server 20, the initial guidance of the activated target may be displayed.

The automatic display setting screen 1200 illustrated in FIG. 9 is a setting screen as the initial guidance for setting whether to automatically display the notification screen 1300 at a predetermined event, for example, at a time of login or at a time of returning from an energy saving (power serving) status. As illustrated in FIG. 9, the automatic display setting screen 1200 includes a display select button 1201, a hide select button 1202, an OK button 1203, a cancel button 1204, and a message display area 1205.

The display select button 1201 is a button for selecting a setting for automatically displaying the notification screen 1300 at the predetermined event, for example, at the time of login or at the time of returning from the energy saving (power saving) status. The hide select button 1202 is a button for selecting a setting for not automatically displaying the notification screen 1300 at the predetermined event, for example, at the time of login or at the time of returning from the energy saving (power saving) status.

The OK button 1203 is a button for confirming a selected setting of either the display select button 1201 or the hide select button 1202 and storing information on the setting in the storage unit 114. That is, when the OK button 1203 is pressed by the user via the input unit 111, the setting unit 542 confirms that the selected setting of either the display select button 1201 or the hide select button 1202, and the information on the setting (hereinafter, the information may be referred to as automatic display setting information) is stored in the storage unit 114. In addition, the setting unit 542 stores the automatic display setting information in the storage unit 114, while storing in the storage unit 114 a checked flag indicating that the initial guidance (initial guidance screen 1100 and automatic display setting screen 1200) has been checked by the logged-in user. The checked flag is used by the determination unit 543 for determining for a screen transition, which is described later.

The cancel button 1204 is a button for transitioning to the initial guidance screen 1100 without confirming the selected setting of either the display select button 1201 or the hide select button 1202.

The message display area 1205 is an area for displaying a message indicating that the setting for whether to automatically display the notification screen 1300 is settable any time in addition to a time at which the initial guidance is displayed.

As described above, after and subsequent to displaying the initial guidance screen 1100 as the initial guidance, the setting whether or not to automatically display the notification screen 1300 is settable via the automatic display setting screen 1200, resulting in facilitating setting for the notification function.

When the user presses the OK button 1203 on the automatic display setting screen 1200 via the input unit 111, and the automatic display setting information and the checked flag are stored, the UI unit 541 causes the display unit 112 to display the notification screen 1300 as illustrated in FIG. 6. In addition, when the notification widget 1001 of the home screen 1000 is pressed by the user via the input unit 111 and the determination unit 543 determines that the user who is currently logs in does not have authority as an administrator, the UI unit 541 causes the display unit 112 to display the notification screen 1300 as illustrated in FIG. 6. In addition, when the notification widget 1001 of the home screen 1000 is pressed by the user via the input unit 111, and when the determination unit 543 determines that the user who is currently logs in has authority as an administrator, determines that another screen having a priority higher than the notification screen 1300 is not currently displayed, and determines that the initial guidance is checked (confirmed) in the past, the UI unit 541 causes the display unit 112 to display the initial guidance screen 1300 as illustrated in FIG. 6.

The notification screen 1300 (an example of a notice screen) illustrate in FIG. 10 is a screen for notifying the notification of information on the functions of the application or firmware that is able to be installed on the MFP 10. By checking the notification screen 1300, the user may check a detail of the function of the application or firmware that is able to be installed on the MFP 10 before the installation. As illustrated in FIG. 10, the notification screen 1300 includes a screenshot display area 1301 (an example of a display area), a forward button 1302*a*, a back button 1302*b*, a display setting button 1303, a detail check button 1304, a help button 1305 and a close button 1306.

The screenshot display area 1301 is an area for displaying a screenshot image of a screen example of the application or firmware being notified to the user on the notification screen 1300. When the user performs a flick operation on the screenshot display area 1301 via the input unit 111, the UI unit 541 displays another screenshot image in the screenshot display area 1301. For example, when the user performs a flick operation from right to left on surface of the paper on which FIG. 10 is drawn via the input unit 111, a next screenshot image (an example of second information), which is different from a current screenshot image (an example of first information), is displayed in the screenshot display area 1301. In addition, when another flick operation from left to right is performed, an image of the previous screenshot is displayed in the screenshot display area 1301. This allows the user to visually grasp the outline indicating how is a use state after the installation of the application or firmware, which is notified to the user on the notification screen 1300. The information to be displayed in the screenshot display area 1301 is not limited to the screenshots of the screens of the application or firmware being notified to the user, and for example, other information indicating the function of the application or firmware may be displayed.

The forward button 1302*a* is a button for displaying a screen for notifying the notification information of a next different application or firmware as the notification screen 1300 when there are a plurality of applications or firmware that are able to be installed on the MFP 10. The back button 1302*b* is a button for displaying the previous screen as the notification screen 1300 when there are the plurality of applications or firmware that are able to be installed on the MFP 10.

The display setting button 1303 is a button for displaying the automatic display setting screen 1200*a*. when the logged-in user does not have the administrator authority, the UI unit 541 does not display (hides) the display setting button 1303 on the notification screen 1300. This allows the user who has the administrator authority, but not the other users who does not have the administrator authority, to set the automatic display of the notification screen 1300 on the automatic display setting screen 1200*a*.

The detail check button 1304 is a button for displaying the installation screen 1400 for installing the application or firmware notified to the user on the notification screen 1300.

The help button 1305 is a button for displaying the help screen 1500 that displays a supplementary explanation about the notification screen 1300.

The close button 1306 is a button for closing the notification screen 1300 and returning to the home screen 1000.

When there is no application or firmware to be notified to the user as one that is able to be installed on the MFP 10, the UI unit 541 causes the display unit 112 to display the notification screen 1300*a* as illustrated in FIG. 11 instead of the notification screen 1300. The notification screen 1300*a* illustrated in FIG. 11 is a screen for notifying the user of the notification information that indicates that there is no application or firmware that is able to be installed on the MFP 10. As illustrated in FIG. 11, the notification screen 1300*a* includes the display setting button 1303, the help button 1305, the close button 1306, and an application site button 1307. Each of the display setting button 1303, the help button 1305, and the close button 1306 has substantially the same function as corresponding one of the display setting button 1303, the help button 1305, and the close button 1306 on the notification screen 1300 described above. The application site button 1307 is a button for displaying a list screen 1700 (described later) indicating a list of applications and/or firmware that are/is able to be installed on the MFP 10.

When the help button 1305 of the notification screen 1300 is pressed by the user via the input unit 111, the UI unit 541 causes the display unit 112 to display the help screen 1500 as illustrated in FIG. 6. Further, when a close button of the help screen 1500 is pressed by the user via the input unit 111, the UI unit 541 causes the display unit 112 to display the notification screen 1300 as illustrated in FIG. 6.

In addition, when the display setting button 1303 of the notification screen 1300 is pressed by the user via the input unit 111, the UI unit 541 causes the display unit 112 to display the automatic display setting screen 1200*a* as illustrated in FIG. 6.

The automatic display setting screen 1200*a* illustrated in FIG. 12 is a setting screen for setting whether to automatically display the notification screen 1300 at the predetermined event, for example, at the time of login or at the time of returning from the energy saving (power serving) status. A difference from the automatic display setting screen 1200 illustrated in FIG. 9, which is described above, is that the automatic display setting screen 1200*a* is not used for a setting to be set at the time of displaying the initial guidance, but is a setting screen used by transitioning from the notification screen 1300. That is, the message indicating that whether to automatically display the notification screen 1300 is settable any time and displayed in the message display area 1205 of the automatic display setting screen 1200 described above, indicates the setting to be set on the automatic display setting screen 1200*a*. Accordingly, as illustrated in FIG. 12, in the automatic display setting screen 1200a, the message display area 1205, which is included in the automatic display setting screen 1200, is not included, and the functions other than the message display area 1205 are the same as the automatic display setting screen 1200. However, when the OK button 1203 is pressed on the automatic display setting screen 1200a, the automatic display setting information is stored in the storage unit 114, but the checked flag is not stored in the storage unit 114.

In addition, when the detail check button 1304 of the notification screen 1300 is pressed by the user via the input unit 111, the UI unit 521 causes the display unit 112 to display the installation screen 1400 as illustrated in FIG. 6.

The installation screen 1400 illustrated in FIG. 13 is a screen for installing the application or firmware notified to the user on the notification screen 1300. In the installation screen 1400 illustrated in FIG. 13, an application, which is referred to as "Scan Transmission Application" is used as an example application to be installed. As illustrated in FIG. 13, the installation screen 1400 includes a screenshot display area 1401, a description display area 1402, and an install button 1403.

The screenshot display area 1401 is an area for displaying a screenshot image of an example screen of the application or firmware to be installed.

The description display area 1402 is an area for displaying a description of the main functions of the application or firmware to be installed.

The install button 1403 is a button for executing the installation of the application or firmware to be installed.

Hereinafter, a description is given of the installation operation when the install button 1403 is pressed by the user via the input unit 111. In the following, the installation operation of the application is described as an example. First, when the user presses the install button 1403 on the installation screen 1400 via the input unit 111, the installation request unit 524 transmits to the application market server 20 a purchase confirmation request that requests to confirm whether the application to be installed has been purchased. The application to be installed is, namely the application being displayed on the installation screen 1400, and hereinafter, may be referred to as a target application. Then, the communication unit 205 of the application market server 20 receives the purchase confirmation request.

The purchase confirmation request unit 204 of the application market server 20 inquires the contract management server 30 whether or not the target application has been purchased according to the purchase confirmation request received by the communication unit 205. The contract management server 30 responds to the inquiry from the purchase confirmation request unit 204 and transmits to the application market server 20 a purchase confirmation result regarding the presence. The communication unit 205 of the application market server 20 transmits the received purchase confirmation result to the MFP 10. Then, the communication unit 113 of the MFP 10 receives the purchase confirmation result.

When the purchase confirmation result received by the communication unit 113 indicates that the purchase of the target application has already been completed, the installation request unit 524 transmits to the application management server 50 an installation request that requests to the install the target application displayed on the installation screen 1400. Then, the application management server 50 receives the installation request. When the purchase confirmation result received by the communication unit 113 indicates that the purchase of the target application has not been completed, for example, the UI unit 521 causes the display unit 112 to display, for example, a message indicating that the target application has not been purchased.

Next, the application management server 50 reads from the auxiliary storage device 955 an object file (application object) of the target application indicated in the received installation request and transmits the object file to the MFP 10. Then, the installation unit 531 of the MFP 10 downloads and acquires the object file of the target application from the application management server 50 via the communication unit 113. Then, the installation unit 531 installs the target application in the storage unit 114 by using the acquired object file. After the above-described operation, the target application is available in the MFP 10.

When a target of the operation performed in response to the install button 1403 being pressed is the firmware, the installation unit 531 downloads the object file of the target firmware from the firmware management server 60 and stores or updates the object file in the ROM 912 to install the firmware.

Example of Screen Transition related to Setting Screen in MFP

Figure 14:
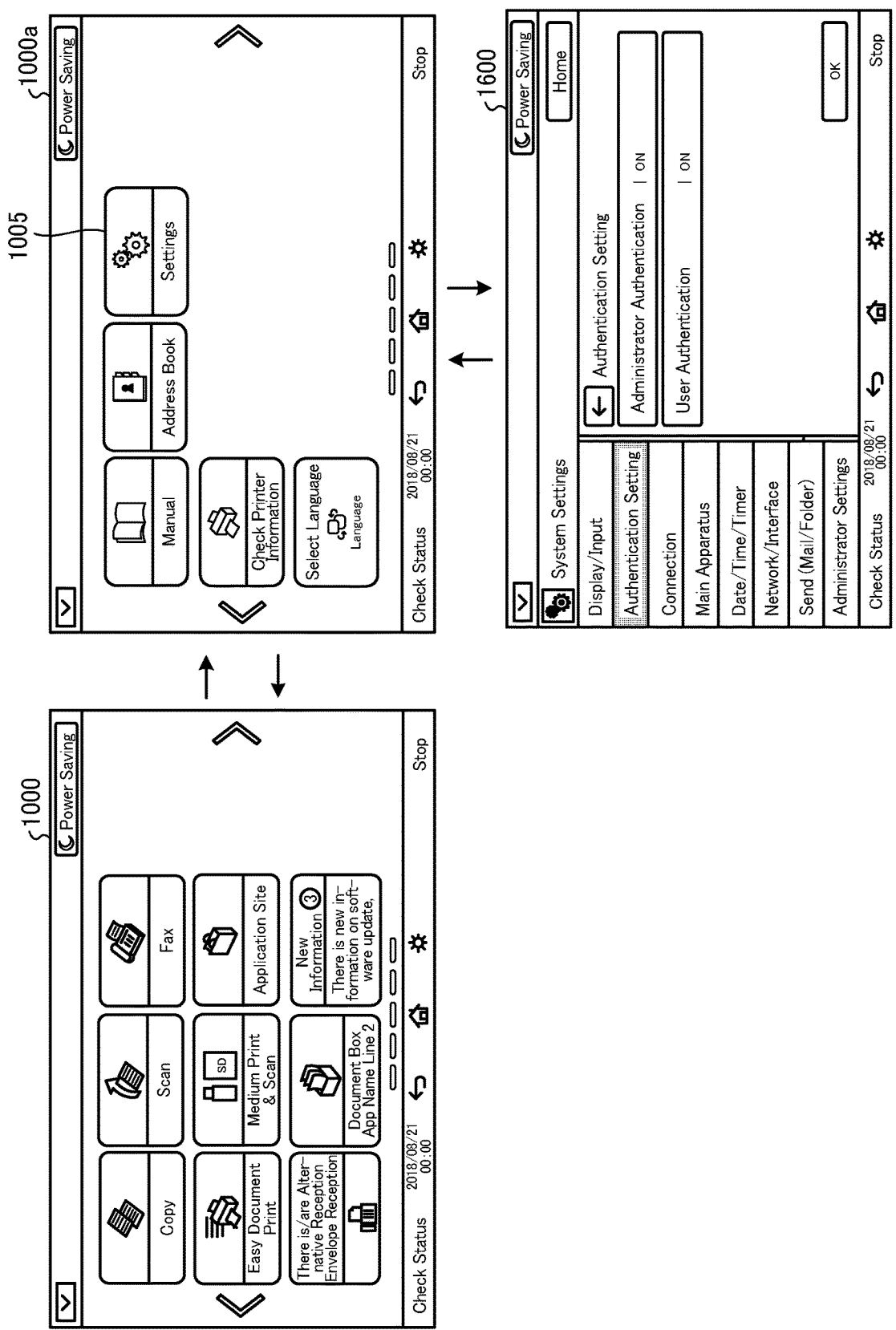
FIG. 14 is a diagram illustrating an example of screen transitions related to a setting screen according to one or more embodiments of the disclosure.
Figure 15:
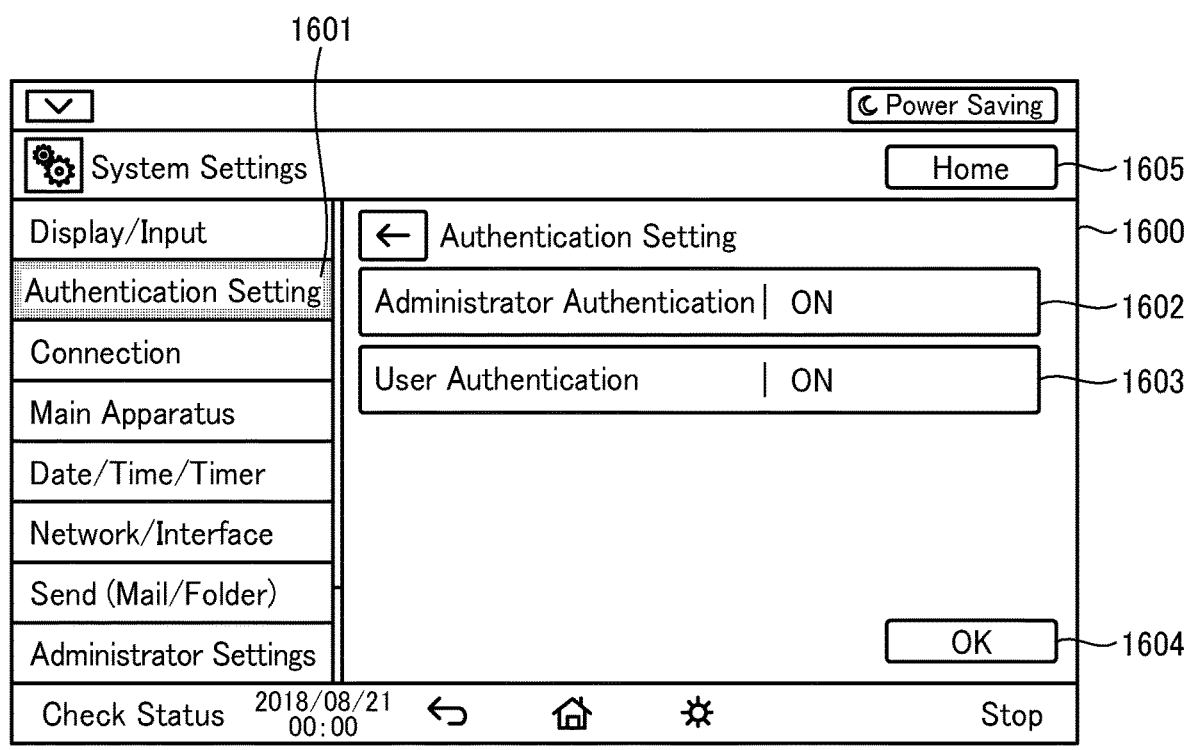
FIG. 15 is a diagram illustrating an example of a setting screen according to one or more embodiments of the disclosure.

FIG. 14 is a diagram illustrating an example of screen transitions related to a setting screen according to one or more embodiments of the present disclosure. FIG. 15 is a diagram illustrating an example of a setting screen according to one or more embodiments of the present disclosure. A description is given below of a flow of a screen transition of the setting screen in the MFP 10 according to the present embodiment with reference to FIG. 14 and FIG. 15.

Referring to FIG. 14, a transition operation that starts from the home screen 1000 to a setting screen 1600 is described below. The setting screen 1600 is for setting whether to authenticate an administrator or users other than the administrator, which may be, hereinafter, referred to as a general user.

When the forward button 1003a of the home screen 1000 is pressed by the user via the input unit 111, the UI unit 541 causes the display unit 112 to display a home screen 1000a, which is a next screen of the home screen 1000, as illustrated in FIG. 14.

As with the home screen 1000, the home screen 1000a illustrated in FIG. 14 is a screen on which buttons for performing various operations are arranged. The home screen 1000a includes a setting button 1005, as illustrated in FIG. 14. The setting button 1005 is a button for displaying the setting screen 1600 for setting various settings. In addition, when a back button (which corresponds to the back button 1003b of the home screen 1000) of the home screen 1000a is pressed by the user via the input unit 111, the UI unit 541 causes the display unit 112 to display the home screen 1000 as illustrated in FIG. 14.

When the setting button 1005 of the home screen 1000a is pressed by the user via the input unit 111, the UI unit 541 causes the display unit 112 to display the setting screen 1600 as illustrated in FIG. 14.

The setting screen 1600 illustrated in FIG. 15 is a screen for performing the various settings of the MFP 10. In the example illustrated in FIG. 15, when an authentication setting select button 1601 included in the setting screen 1600 is pressed, a setting whether to authenticate an administrator and/or a general user is displayed. As illustrated in FIG. 15, the setting screen 1600 includes the authentication setting select button 1601, an administrator authentication setting button 1602, a user authentication setting button 1603, an OK button 1604, and a home button 1605. A function of the authentication setting select button 1601 is as described above.

The administrator authentication setting button 1602 is a button for switching a setting between to perform or not to perform authentication to authenticate an administrator (hereinafter, may be referred to as administrator authentication). In the example illustrated in FIG. 15, a setting status for the administrator authentication is active (ON).

The user authentication setting button 1603 is a button for switching a setting between to perform or not to perform authentication to authenticate a general user (hereinafter, may be referred to as user authentication). In the example illustrated in FIG. 15, a setting status for the user authentication is active (ON).

The OK button 1604 is a button for confirming the authentication setting switched, or set, by the administrator authentication setting button 1602 and the user authentication setting button 1603 and storing the information on the setting in the storage unit 114. That is, when the OK button 1604 is pressed by the user via the input unit 111, the setting unit 542 confirms that the selected setting, or the switched setting, by the administrator authentication setting button 1602 and the user authentication setting button 1603, and information on the setting (hereinafter, the information may be referred to as authentication setting information) is stored in the storage unit 114.

The home button 1605 is a button for returning to the home screen 1000a.

Example of Screen Transition related to Installation Screen in MFP

Figure 16:
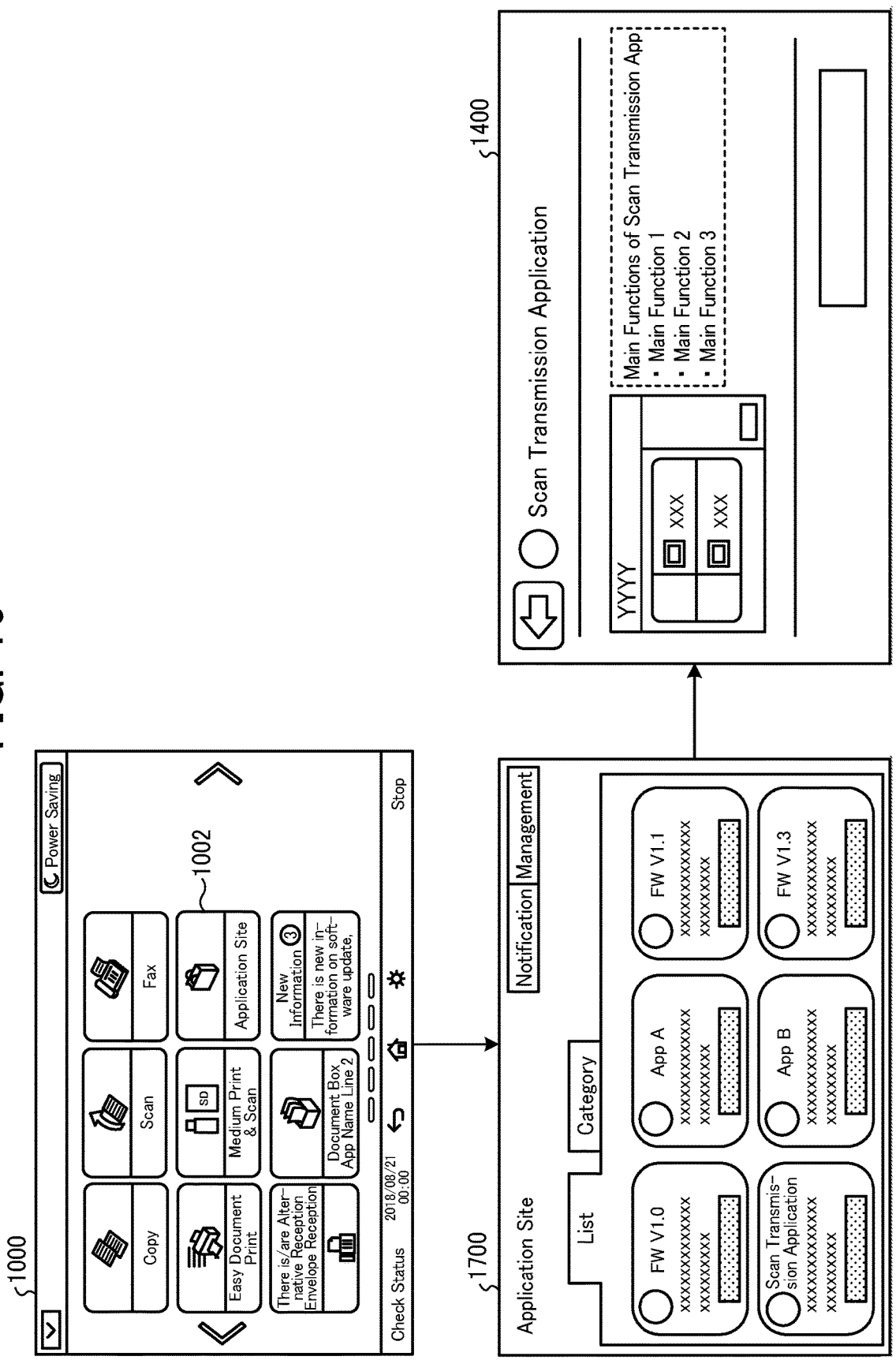
FIG. 16 is a diagram illustrating an example of screen transitions related to a list screen according to one or more embodiments of the disclosure.
Figure 17:
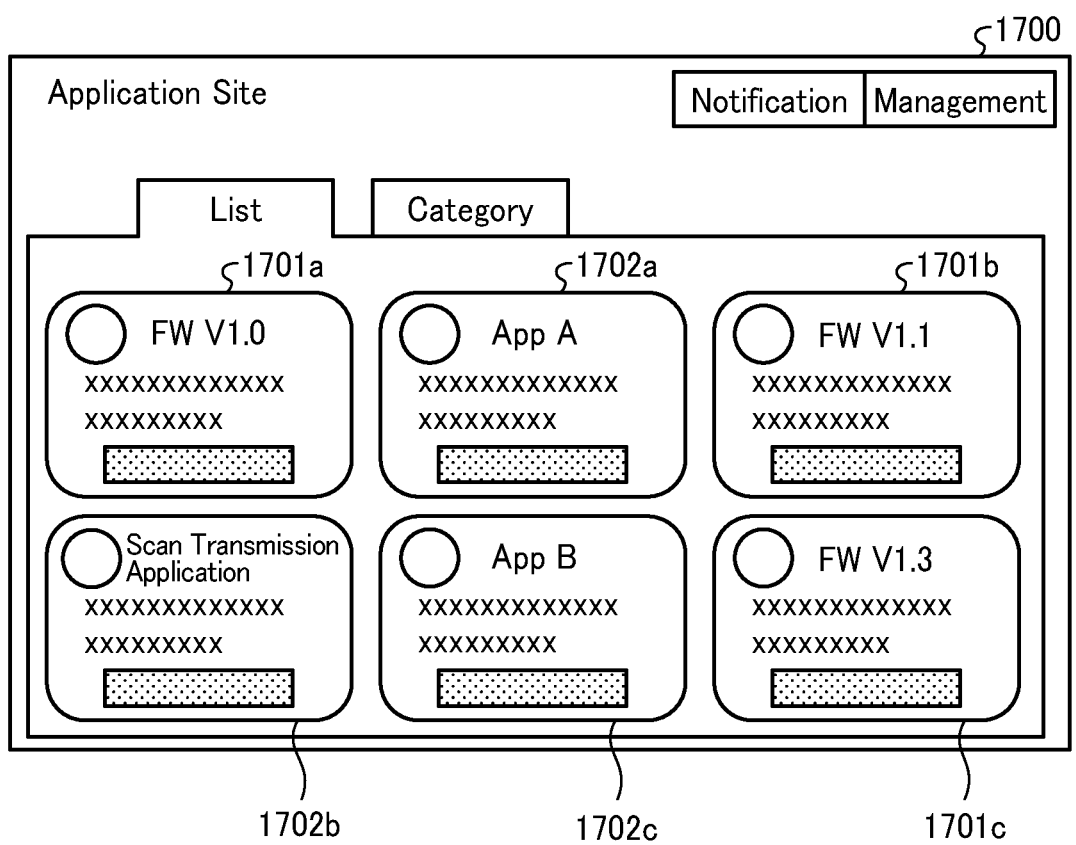
FIG. 17 is a diagram illustrating an example of a list screen according to one or more embodiments of the disclosure.

FIG. 16 is a diagram illustrating an example of screen transitions related to a list screen according to one or more embodiments of the present disclosure. FIG. 17 is a diagram illustrating an example of a list screen according to one or more embodiments of the present disclosure. A description is given below of a flow of a screen transition of the list screen in the MFP 10 according to the present embodiment with reference to FIG. 16 and FIG. 17.

Referring to FIG. 16, a transition operation that starts from the home screen 1000 to the installation screen 1400 via the list screen 1700 is described below.

When the application site button 1002 of the home screen 1000 is pressed by the user via the input unit 111, the list request unit 522 transmits a request (list request) to the application market server 20 for a list of applications and/or firmware that are/is able to be installed on the MFP 10. Then, the communication unit 205 of the application market server 20 receives the list request.

The list response unit 201 of the application market server 20 acquires information on the applications and/or firmware that are/is able to be installed on the MFP 10 from the auxiliary storage device 955 according to the list request received by the communication unit 205, and transmits the information to the MFP 10 as a list. Then, the communication unit 113 of the MFP 10 receives the list.

Then, the UI unit 521 of the MFP 10 causes the display unit 112 to display the list screen 1700 using the list received by the communication unit 113, as illustrated in FIG. 16.

The list screen 1700 illustrated in FIG. 17 is a screen for displaying the list, as buttons (icons), based on the information on the applications and/or firmware that are/is able to be installed on the MFP 10. As illustrated in FIG. 17, the list screen 1700 includes firmware buttons 1701a to 1701c and application buttons 1702a to 1702c.

The firmware button 1701a is a button for displaying an installation screen for installing a firmware (FW) of "FW V1.0". The firmware button 1701b is a button for displaying an installation screen for installing a firmware of "FW V1.1". The firmware button 1701b is a button for displaying an installation screen for installing a firmware of "FW V1.3".

The application button 1702a is a button for displaying an installation screen for installing an application of "App A". The application button 1702b is a button for displaying an installation screen for installing the application of "Scan Transmission Application". The application button 1702a is a button for displaying an installation screen for installing an application of "App B".

For example, when the application button 1702b of the list screen 1700 is pressed by the user via the input unit 111, the UI unit 521 causes the display unit 112 to display the installation screen 1400 (see FIG. 13) as illustrated in FIG. 16.

As described above, the user is allowed to select a desired application or firmware from the applications or firmware listed on the list screen 1700 as well as the application or firmware notified to the user on the notification screen 1300 and execute the installation.

Screen Display Operation in response to Notification Widget being Pressed

Figure 18:
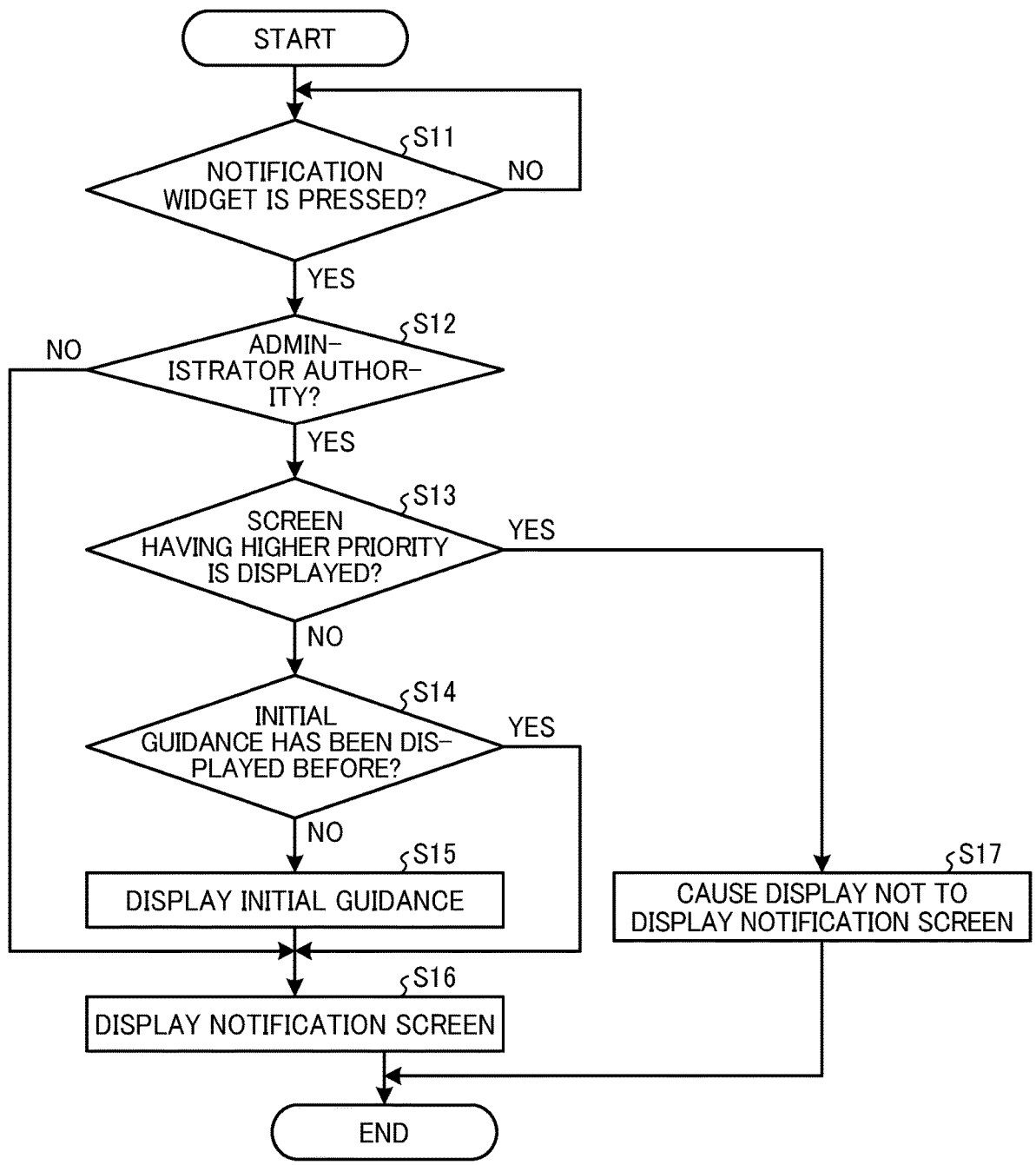
FIG. 18 is a flowchart illustrating an example of a process of displaying a notification screen when a notification widget is pressed in an information processing system according to one or more embodiments.

FIG. 18 is a flowchart illustrating an example of a process of displaying a notification screen when a notification widget is pressed in an information processing system according to one or more embodiments of the present disclosure. A description is given below of a process of displaying a screen (screen display operation) when the notification widget 1001 of the home screen 1000 is pressed in the MFP 10 according to the present embodiment with reference to FIG. 18.

<Step S11>

When the notification widget 1001 of the home screen 1000 is pressed by a user via the input unit 111 (step S11: Yes), the process proceeds to step S12.

<Step S12>

The determination unit 543 of the MFP 10 determines whether the user, who is currently loges in, has administrator authority or not. For example, the determination unit 543 may transmit inquires to the common management server 40 about the administrator authority based on account information (for example, user ID, password) of a logged-in user, and acquire information indicating the presence or absence of the administrator authority. If the logged-in user has the administrator authority (step S12: Yes), the process proceeds to step S13, and if the logged-in user does not have the administrator authority (step S12: No), the process proceeds to step S16.

<Step S13>

The determination unit 543 further determines whether a screen having a higher priority than the notification screen 1300 is displayed by the display unit 112 at this time. Examples of the screen having a higher priority than the notification screen 1300 include an authentication screen at a time of login, a status confirmation screen for displaying a status of the MFP 10, a job screen, and a help screen. When a screen having a higher priority than the notification screen 1300 is displayed (step S13: Yes), the process proceeds to step S17, and when the screen having a higher priority than the notification screen 1300 is not displayed (step S13: No), the process proceeds to step S14.

<Step S14>

The determination unit 543 further determines whether the initial guidance has been checked, or confirmed (displayed), in the past, namely whether the initial guidance screen 1100 has previously displayed or not. Specifically, the determination unit 543 makes the-above mentioned determination regarding the initial guidance by referring to the storage unit 114 and checking whether the checked flag is stored. When the initial guidance has been checked in the past, that is, the checked flag is stored (step S14: Yes), the process proceeds to step S16, and when the initial guidance has not been checked, that is, the checked flag is not stored (step S14: No), the process proceeds to step S15.

<Step S15>

When the determination unit 543 determines that the user who is currently logs in (logged-in user) has authority as an administrator (administrator authority), that another screen having a higher priority than the notification screen 1300 is not currently displayed, and that the initial guidance is not checked (confirmed) in the past, the UI unit 541 of the MFP 10 causes the display unit 112 to display the initial guidance screen 1100 (for example, see FIG. 8). Then, when the content of the initial guidance screen 1100 is checked, or confirmed, and the automatic display setting information is set on the next transitioned automatic display setting screen 1200 (see, for example, FIG. 9), the process proceeds to step S16.

<Step S16>

When the user presses the OK button 1203 on the automatic display setting screen 1200 via the input unit 111, and the automatic display setting information and the checked flag are stored, the UI unit 541 of the MFP 10 causes the display unit 112 to display the notification screen 1300. In addition, when the notification widget 1001 of the home screen 1000 is pressed by the user via the input unit 111, and the determination unit 543 determines that the user who is currently logs in (logged-in user) does not have the authority as an administrator, or the administrator authority, (step S12: No), the UI unit 541 causes the display unit 112 to display the notification screen 1300. In addition, when the notification widget 1001 of the home screen 1000 is pressed by the user via the input unit 111, and the determination unit 543 determines that the user who is currently logs in (logged-in user) has the authority as an administrator, or the administrator authority, that another screen having a higher priority than the notification screen 1300 is not currently displayed, and that the initial guidance is checked (confirmed) in the past (step S14: Yes), the UI unit 541 causes the display unit 112 to display the notification screen 1300.

<Step S17>

When the determination unit 543 determines that the logged-in user has the administrator authority and a screen having a higher priority than the notification screen 1300 is displayed, the UI unit 541 of the MFP 10 cause the display unit 112 not to display the notification screen 1300. That is, the MFP 10 does not cause the display unit 112 to display the notification screen 1300. This prevents the screen transition from the screen having a higher priority than the notification screen 1300 to the notification screen 1300 and the screen having a higher priority than the notification screen 1300 is to be continuously displayed.

The process flow of the above steps S11 to S17 is performed as a process of displaying a screen (screen display operation) in a case where the notification widget 1001 of the home screen 1000 is pressed.

Screen Display Operation in response to Mode Returning from Energy Saving Mode

Figure 19:
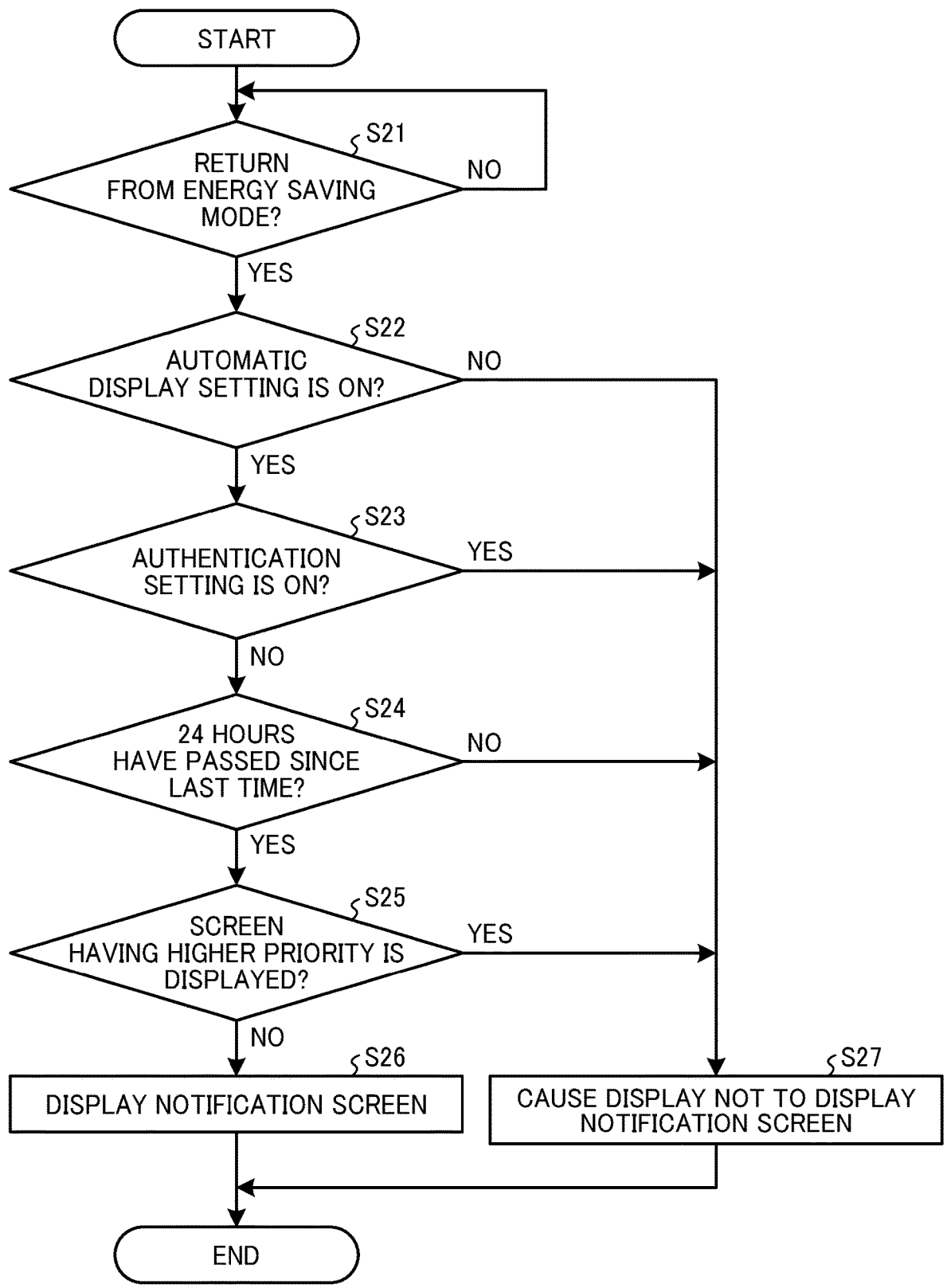
FIG. 19 is a flowchart illustrating an example of a process of displaying a notification screen when an information processing system returns from an energy saving mode according to one or more embodiments.

FIG. 19 is a flowchart illustrating an example of a process of displaying a notification screen when an information processing system returns from an energy saving mode according to one or more embodiments of the present disclosure. A description is given below of a process of displaying a screen (screen display operation) when the MFP 10 returns from an energy saving mode (energy saving status), according to the present embodiment with reference to FIG. 19. Table 1, which is given below is a table illustrating authentication settings, conditions of login statuses, and a condition of event type, regarding whether the notification screen 1300 is automatically displayed or not. The authentication settings are information (authentication setting information) indicating whether the administrator authentication setting and the user authentication setting, which are the authentication settings set in the MFP 10, are individually activated (ON: perform authentication) or not activated (OFF: not perform authentication). When each authentication setting is activated, the authentication screen (screen for requesting a user for authentication) is to be displayed in response to the MFP 10 being started or returning from the energy saving mode (status). Then, after the authentication and the login succeeds, the functions of the MFP 10 are available. The login status is information indicating which user, or which role of a user, (for example, an administrator or a general user) is logged in or not logged in when an event occurs. The settings and the login statuses are stored as flags in a storage unit such as the RAM 913 or the storage 914. In addition, via the main device control unit 121, the flags are acquirable, or the settings of the flags are modifiable (activate the setting (ON) or deactivate the setting (OFF), change a role). The event type indicates a type of event that occurs related to the MFP 10. For example, an event is that a person in each role logs in to the MFP 10 or that the MFP 10 returns from the energy saving mode. The login statuses and the event type are, in other words, conditions that is in association with the authentication settings (conditions regarding the authentication settings). A description is given with reference to Table 1. Note that Table 1 is not limited to the one described above. For example, in a case where the settings are set in a manner that the administrator authentication is activated (ON) and the user authentication is activated (ON), and the login status indicates that no one logs in, the notification screen may be displayed in response to an occurrence of an event of login of a general user. Due to this, even when the administrator authentication is set as ON, the notification screen is also displayed to a general user. In addition, changing a setting regarding Display/Not Display (Hide), and changing, adding, or deleting a condition or an event in Table 1 may be performed, as a notification widget setting, from a detail setting button, which may be displayed on the automatic display setting screen 1200, via the operation panel 905 of the MFP 10, for example.

TABLE 1

| | Conditions | | | | | | | |
|---|---|---|---|---|---|---|---|---|
| | Administrator Authentication is ON | | | | Administrator Authentication is OFF | | | |
| | User Authentication is ON | | User Authentication is OFF | | User Authentication is ON | | User Authentication is OFF | |
| Event | Administrator Logs in | User Logs in | No One logs in | Administrator Logs in | User Logs in | User Logs in | No One logs in | — |
| Administrator Logs in | — | — | Display | — | Display | — | — | — |
| General User Logs in | — | — | Not Display | — | — | — | Display | — |
| Returning from Energy Saving Mode | Not Display | Not Display | Not Display | Not Display | Not Display | Not Display | Not Display | Display |

<Step S21>
When the MFP10 returns from the energy saving mode in response to a user operation or the like in the MFP10 (step S21: Yes), the process proceeds to step S22.

<Step S22>
The determination unit 543 of the MFP 10 refers to the storage unit 114 and determines whether the automatic display setting information indicates that the notification screen 1300 is set to be automatically displayed or not. When the automatic display setting information indicates that the notification screen 1300 is set to be automatically displayed (step S22: Yes), the process proceeds to step S23, and when the setting is not to automatically display (step S22: No), the process proceeds to Step S27.

<Step S23>
The determination unit 543 refers to the storage unit 114 and determines whether the authentication setting information indicates that the setting of the administrator authentication or the user authentication is activated or not. When the authentication setting information (an example of a determination result) indicates that the setting of the administrator authentication or the user authentication is activated (step S23: Yes), that is, when all the conditions other than administrator authentication OFF and user authentication OFF are satisfied in Table 1, the process proceeds to step S27. On the other hand, when the settings of the administrator authentication and the user authentication are not activated (step S23: No), that is, when the administrator authentication setting is OFF and the user authentication setting is OFF in Table 1, the process proceeds to step S24.

<Step S24>
The determination unit 543 determines whether 24 hours have passed, or elapsed, since the notification screen 1300 is last displayed after the MFP 10 returns from the energy saving mode. When 24 hours have passed (step S24: Yes), the process proceeds to step S25, on the other hand, when 24 hours have not passed (step S24: No), the process proceeds to step S27. That is, a time counted from a time when the notification screen 1300 is displayed on the display at the most recent time is within a pre-set time, or a predetermined time, (for example, within 24 hours), which may be set, for example, by a designer, developer, or a user. The elapsed time for the determination is not limited to 24 hours and may be a time other than 24 hours, for example, 12 hours (half a day).

<Step S25>
The determination unit 543 further determines whether a screen having a higher priority than the notification screen 1300 is currently displayed by the display unit 112. When the screen having a higher priority than the notification screen 1300 is currently displayed (step S25: Yes), the process proceeds to step S27, and when the screen having a higher priority than the notification screen 1300 is not currently displayed (step S25: No), the process proceeds to step S26.

<Step S26>
The UI unit 541 of the MFP 10 causes the display unit 112 to automatically display the notification screen 1300. Accordingly, the notification screen 1300 is automatically displayed, and this allows the user to check details of the functions of the one or more applications or firmware that are or is able to be installed on the MFP 10 when the user uses the MFP 10 after MFP 10 returns from the energy saving mode.

<Step S27>
The UI unit 541 of the MFP 10 cause the display unit 112 not to display the notification screen 1300. That is, the MFP 10 does not cause the display unit 112 to display the notification screen 1300. The reason why the notification screen 1300 is not displayed when the authentication setting information indicates that the setting of the administrator authentication setting or the user authentication setting is activated is that a normal login operation is required when the MFP 10 returns from the energy saving mode, that is, a process of automatically displaying the notification screen 1300 is performed at a time of the login. In addition, when 24 hours have not passed since the notification screen 1300 is displayed at the last time after the MFP 10 returns from the energy saving mode, the notification screen 1300 is caused not to be displayed. This reduces the troublesomeness caused by the notification screen 1300 being displayed frequently. In addition, when a determination indicates that a screen having a higher priority than the notification screen 1300 is displayed, the notification screen 1300 is not displayed. This prevents an event of transitioning from the higher-priority screen, which is a screen having a higher priority than the notification screen 1300, to the notification screen 1300, and this allows the higher-priority screen to keep being displayed.

As described above, by the steps S21 to S27, the screen display operation in response to a mode returning from the energy saving mode is performed.

Screen Display Operation in response to Log in to MFP

Figure 20:
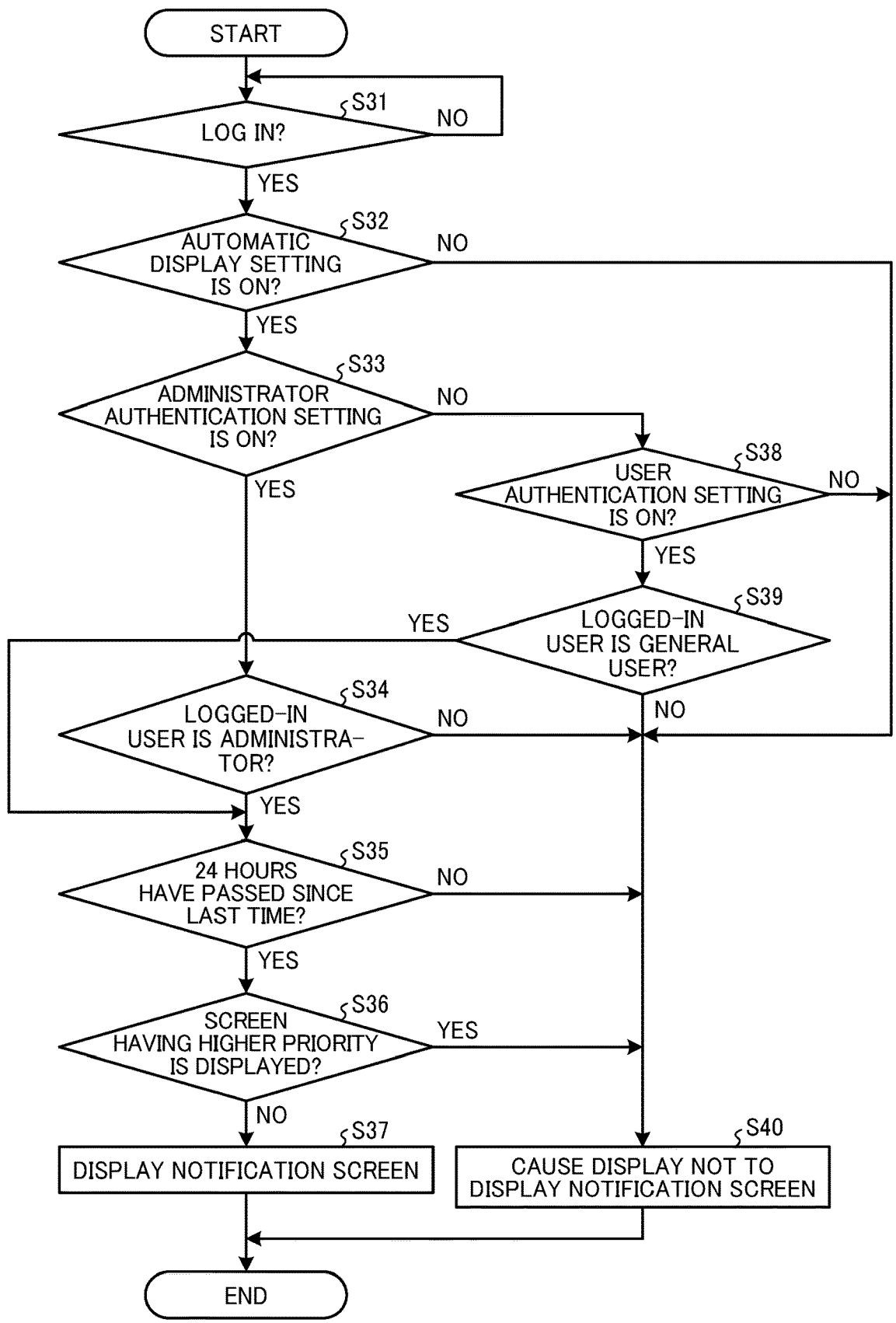
FIG. 20 is a flowchart illustrating an example of a process of displaying a screen performed in response to an operation of logging in to an information processing system according to one or more embodiments of the disclosure.

FIG. 20 is a flowchart illustrating an example of a process of displaying a screen (screen display operation) performed in response to an operation of logging in to an information processing system according to one or more embodiments of the present disclosure. A description is given below of a screen display operation in response to a log-in to the MFP 10 according to the present embodiment with reference to FIG. 20.

<Step S31>

When a user logs in to the MFP 10 (step S31: Yes), the process proceeds to step S32.

<Step S32>

The determination unit 543 of the MFP 10 refers to the storage unit 114 and determines whether the automatic display setting information indicates that the notification screen 1300 is set to be automatically displayed or not. When the automatic display setting information indicates that the notification screen 1300 is set to be automatically displayed (step S32: Yes), the process proceeds to step S33, and when the setting is not to automatically display (step S32: No), the process proceeds to Step S40.

<Step S33>

The determination unit 543 refers to the storage unit 114 and determines whether the authentication setting information indicates that the setting of the administrator authentication is activated or not. When the authentication setting information indicates that the setting of the administrator authentication is activated (step S33: Yes), the process proceeds to step S34. On the other hand, when the authentication setting information indicates that the setting of the administrator authentication is not activated (step S33: No), the process proceeds to step S38.

<Step S34>

The determination unit 543 determines whether the user who is currently loges in (logged-in user) has the administrator authority or not. For example, the determination unit 543 may transmit inquires to the common management server 40 about the user authority based on account information (for example, user ID, password) of the logged-in user, and acquire information indicating the presence or absence of the administrator authority. Alternatively, the determination unit 543 may transmit inquires to the main device control unit 121 about the user information and role information (for example, administrator or general user) possessed by the MFP 10 and determine whether the logged-in user is an administrator or not. When the logged-in user has the administrator authority (step S34: Yes), that is, when the user (administrator) who has the administrator authority logs in under a state of conditions that the administrator authentication setting is ON and other users have not logged in, in (Table 1), the process proceeds to step S35. On the other hand, when the logged-in user does not have the administrator authority (step S34: No), that is, when the user who is a general user having no administrator authority logs in under a state of conditions that the administrator authentication setting is ON and no one is currently logs in, in (Table 1), the process proceeds to step S40.

<Step S35>

The determination unit 543 determines whether 24 hours have passed since the logged-in user logged in at the last time and the notification screen 1300 is displayed. When 24 hours have passed (step S35: Yes), the process proceeds to step S36, on the other hand, when 24 hours have not passed (step S35: No), the process proceeds to step S40. That is, a time counted from a time when the notification screen 1300 is displayed on the display at the most recent time is within a pre-set time, or a predetermined time, (for example, within 24 hours), which may be set, for example, by a designer, developer, or a user. The elapsed time for the determination is not limited to 24 hours and may be a time other than 24 hours, for example, 12 hours (half a day).

<Step S36>

The determination unit 543 further determines whether a screen having a higher priority than the notification screen 1300 is currently displayed by the display unit 112 or not. When the screen having a higher priority than the notification screen 1300 is currently displayed (step S36: Yes), the process proceeds to step S40, and when the screen having a higher priority than the notification screen 1300 is not currently displayed (step S36: No), the process proceeds to step S37.

<Step S37>

The UI unit 541 of the MFP 10 causes the display unit 112 to automatically display the notification screen 1300. Accordingly, the notification screen 1300 is automatically displayed, and this allows the user to check details of the functions of the one or more applications or firmware that are or is able to be installed on the MFP 10 when the user loges into the MFP 10 for use.

<Step S38>

The determination unit 543 refers to the storage unit 114 and determines whether the authentication setting information indicates that the setting for the user authentication is activated or not. When the authentication setting information indicates that the setting for the user authentication is activated (step S38: Yes), that is, when the conditions in Table 1 indicates that the administrator authentication is OFF and the user authentication is ON, the process proceeds to step S39. However, in this case, since the user does not be required to perform a login operation, there is not an actual case in which the "No" branch of step S38 is taken. On the other hand, when the setting for the user authentication is not activated (step S38: No), that is, when the conditions in Table 1 indicates that the administrator authentication is OFF and the user authentication is OFF, the process proceeds to step S40.

<Step S39>

The determination unit 543 determines whether the user who is currently loges in (logged-in user) has the administrator authority or not. For example, the determination unit 543 may transmit inquires to the common management server 40 about the administrator authority based on account information (for example, user ID, password) of the logged-in user, and acquire information indicating the presence or absence of the administrator authority. Alternatively, the determination unit 543 may transmit inquires to the main device control unit 121 about the user information and role information (for example, administrator or general user) possessed by the MFP 10 and determine whether the logged-in user is an administrator or not. When the logged-in user is a general user who does not have the administrator authority (step S39: Yes), that is, when the user who is a general user having no administrator authority logs in under a state of conditions that the administrator authentication setting is OFF, the user authentication setting is ON, and other user has not logged in, in (Table 1), the process proceeds to step S35. On the other hand, when the logged-in user has the administrator authority (step S39: No), that is, the process proceeds to step S40. However, in this case, since the administrator authentication setting is OFF and the user authentication setting is ON in (Table 1), the user who logs in is supposed to be a general user, so that the "No" branch of step S39 is not substantially taken.

<Step S40>

The UI unit 541 of the MFP 10 causes the display unit 112 not to display the notification screen 1300. That is, the MFP 10 does not cause the display unit 112 to display the notification screen 1300. When the administrator authentication setting is ON and when the logged-in user is not an administrator, but a general user, the notification screen 1300 is not displayed, and when the logged in user is an administrator (and the other conditions are further satisfied), the notification screen 1300 is displayed, and thereby the notification information by the notification screen 1300 is provided to the administrator, which results in prompting the administrator to perform the installation. In addition, when 24 hours have not passed since the notification screen 1300 is displayed at the last time after the last login, the notification screen 1300 is caused not to be displayed. This reduces the troublesomeness caused by the notification screen 1300 being displayed frequently. In addition, when a determination indicates that a screen having a higher priority than the notification screen 1300 is displayed, the notification screen 1300 is not displayed. This prevents an event of transitioning from the higher-priority screen, which is a screen having a higher priority than the notification screen 1300, to the notification screen 1300, and this allows the higher-priority screen to keep being displayed.

The process flow of the above steps S31 to S40 is performed as the screen display operation in a case where a user logs in.

The notification screen 1300 automatically displayed in step S26 of FIG. 19 and step S37 of FIG. 20 may turns not to be displayed when the close button of the notification screen 1300 is pressed, when the button for shifting to the home screen is pressed, when logout is automatically occurs, or when a screen having a higher priority than the notification screen 1300 is displayed, for example. However, the higher-priority screen may be hidden and then the notification screen 1300 may be displayed again, after the notification screen 1300 is hidden and then the higher-priority screen is displayed.

Further, as examples of the event for automatically displaying the notification screen 1300 when the automatic display setting information is set to automatically display the notification screen 1300, the above-mentioned events in which the MFP 10 has returned from the energy saving mode, and the event in which a user logs in to the MFP 10 are described, but this is not limiting. For example, the notification screen 1300 may be automatically displayed after a certain period of time (for example, one day). In addition, the notification screen 1300 may be automatically displayed when a specific application is started, when an updated version of the application is able to be updated, or when an application or firmware related to the application are able to be installed.

As described above, the MFP 10 according to the present embodiment displays the notification screen 1300 for notifying the notification information about the functions of the one or more applications and/or the firmware that are able to be installed on the MFP 10 at a time of occurrence of a predetermined event. For example, the notification screen 1300 is displayed on condition that the notification widget 1001 of the home screen 1000 is pressed at least. Further, for example, when the automatic display setting information is set to be automatically displayed, the notification screen 1300 is displayed at least on the condition that the MFP 10 has returned from the energy saving mode, or at least on the condition that a user has logged in to the MFP 10. As a result, the function(s) of the one or more applications or firmware that are installable is (are) appropriately notified to a user, resulting in improving the convenience of the user. Furthermore, such the notification and the initial guidance are displayed more frequently to administrators who introduces or sets software on the MFP 10 more frequently than general users. On the other hand, frequency to display such the notification and the initial guidance to the general users reduces not to disturb the general user working with the MFP 10. That is, displaying such the notification and the initial guidance is performed depending on a role of user. In addition, by considering occurrence of a plurality of events, the notification screen is prevented from often being displayed. In addition, misidentification and erroneous operation of the user may be reduced without interfering with the display of a screen having a higher priority than the notification screen.

Further, in the MFP 10 according to the present embodiment, when the notification widget 1001 of the home screen 1000 is pressed, at least when the determination unit 543 determines that the initial guidance has not been checked, or confirmed, in the past, the initial guidance screen 1100 is displayed. Accordingly, checking the initial guidance screen 1100 allows the user to know the outline of the notification function in advance.

Each of the functions of the above-described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

Note that, in a case where at least a portion of the functional units of the MFP 10 or the application market server 20 according to the above-described embodiment is implemented by execution of a computer program, the program can be prestored in a ROM or the like. Alternatively, the computer program executed in the MFP 10 or the application market server 20 according the above-described embodiment can be provided as a file being in an installable format or an executable format and stored in a computer-readable recording medium, such as a compact disc read only memory (CD-ROM), a flexible disk (FD), a compact disc recordable (CD-R), and a digital versatile disk (DVD). Alternatively, the program executed in the MFP 10 or the application market server 20 according to any of the embodiments described above may be stored in a computer connected to a network such as the Internet and downloaded via the network, thus being providable. Alternatively, the program executed in the MFP 10 or the application market server 20 according to any of the embodiments described above may be provided or distributed via a network such as the Internet. The program executed in the in the MFP 10 and the application market server 20 according the above-described embodiment is in the form of module including at least a portion of the above-described functional units. As actual hardware, when the CPU reads out the program from the above-described memory and executes the program, the above-described functional units are loaded and implemented (generated) on a main memory.

In installation or update of software, in particular, such as the latest application or firmware, many functions may be added, or functions may be subjected to a major change. A process of introducing software including installing a new application or firmware and updating an application or firmware may be collectively referred to as installation or installing. However, in a conventional technique, in order to prompt a user to use or to understand functions of an application or firmware to be installed, there is not enough mechanism provided for appropriately notifying the user of information on the functions according to an authentication status or various other statuses of the application or the firmware.

One or more embodiments of the present disclosure has been made in view of the above-described problem, and an object of the one or more embodiments of the present disclosure is to provide an electronic apparatus, an information processing system, a method of processing information, and a non-transitory computer-readable recording medium capable of appropriately notifying a user of functions of software that is installable.

According to one or more embodiments of the present disclosure, it is possible to appropriately notify a user of functions of software that is installable.

Any one of the above-described operations may be performed in various other ways, for example, in an order different from the one described above.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An electronic apparatus, comprising
circuitry configured to
  acquire, from an external server, information related to software that is downloadable by the electronic apparatus through a network and that is installable by the electronic apparatus;
  determine a result indicating whether conditions of authentication settings with respect to the electronic apparatus are satisfied; and
  control a display to display a notification screen, for notifying the acquired information, according to the result, wherein
the display is a touch panel,
the notification screen includes a display area to display information on a function of the software, the information including first information and second information that is different from the first information, and
in a case that a flick operation is performed on a part of the touch panel corresponding to the display area, which currently displays the first information, the circuitry controls the display to display the second information in replace of the first information.

2. The electronic apparatus according to claim 1, wherein the circuitry controls the display to display the notification screen in a case that the result indicates that the conditions are satisfied when a user logs in to the electronic apparatus.

3. The electronic apparatus according to claim 1, wherein the circuitry controls the display to display the notification screen in a case that the result indicates that the conditions are satisfied when the electronic apparatus returns from an energy saving status.

4. The electronic apparatus according to claim 1, wherein the circuitry controls the display not to display the notification screen in a case that a time counted from a time when the notification screen is displayed by the display at the most recent time is within a pre-set time.

5. The electronic apparatus according to claim 1, wherein the circuitry controls the display not to display the notification screen in a case that the display currently displays a screen having a higher priority than the notification screen.

6. The electronic apparatus according to claim 1, wherein the conditions of authentication settings include whether an administrator authentication setting, set in the electronic apparatus, is activated.

7. The electronic apparatus according to claim 1, wherein the circuitry controls the display to display the acquired information as a widget on a predetermined screen.

8. The electronic apparatus according to claim 7, wherein the circuitry controls the display to display a notification screen for notifying the acquired information in response to an input operation performed on the widget.

9. The electronic apparatus according to claim 8, wherein the circuitry controls the display to display a guidance screen before displaying the notification screen in a case that the circuitry has not previously displayed the guidance screen when the input operation is performed on the widget, the guidance screen including at least a screen for introducing a notification function of the notification screen.

10. An information processing system, comprising
the electronic apparatus according to claim 1; and
a server that is the external server, the server including server circuitry configured to provide the information to the electronic apparatus, wherein
the server circuitry transmits the information to the electronic apparatus in response to a request for the information from the electronic apparatus.

11. A method of processing information, comprising:
acquiring, by an electronic apparatus from a server, information related to software that is downloadable by the electronic apparatus through a network and that is installable by the electronic apparatus;
determining, by circuitry of the electronic apparatus, a result indicating whether conditions of authentication settings with respect to the electronic apparatus are satisfied; and
controlling, by the circuitry, a display to display a notification screen, for notifying the acquired information, according to the result, wherein
the display is a touch panel,
the notification screen includes a display area to display information on a function of the software, the information including first information and second information that is different from the first information, and
the method further comprises, in a case that a flick operation is performed on a part of the touch panel corresponding to the display area, which currently displays the first information, controlling the display to display the second information in replace of the first information.

12. The method according to claim 11, further comprising controlling the display to display the notification screen in a case that the result indicates that the conditions are satisfied when a user logs in to the electronic apparatus.

13. The method according to claim 11, further comprising controlling the display to display the notification screen in a case that the result indicates that the conditions are satisfied when the electronic apparatus returns from an energy saving status.

14. The method according to claim 11, further comprising controlling the display not to display the notification screen in a case that a time counted from a time when the notification screen is displayed by the display at the most recent time is within a pre-set time.

15. The method according to claim 11, further comprising controlling the display not to display the notification screen in a case that the display currently displays a screen having a higher priority than the notification screen.

16. The method according to claim 11, wherein the conditions of authentication settings include whether an administrator authentication setting, set in the electronic apparatus, is activated.

17. The method according to claim 11, further comprising controlling the display to display the acquired information as a widget on a predetermined screen.

18. The method according to claim 17, further comprising controlling the display to display a notification screen for notifying the acquired information in response to an input operation performed on the widget.

19. A computer-readable non-transitory recording medium storing a program for causing circuitry of an electronic apparatus to execute a method, the method comprising:

acquiring, from a server, information related to software that is downloadable by the electronic apparatus through a network and that is installable by the electronic apparatus;

determining, by the circuitry, a result indicating whether conditions of authentication settings with respect to the electronic apparatus are satisfied; and controlling, by the circuitry, a display to display a notification screen, for notifying the acquired information, according to the result, wherein the display is a touch panel, the notification screen includes a display area to display information on a function of the software, the information including first information and second information that is different from the first information, and the method further comprises, in a case that a flick operation is performed on a part of the touch panel corresponding to the display area, which currently displays the first information, controlling the display to display the second information in replace of the first information.

\* \* \* \* \*